United States Patent
Feng et al.

(10) Patent No.: US 7,315,580 B2
(45) Date of Patent: Jan. 1, 2008

(54) METHOD AND APPARATUS FOR HIGH-ORDER PAPR REDUCTION OF AN OFDM SIGNAL

(75) Inventors: Chih-Chun Feng, Beigang Township, Yunlin County (TW); Chih-Yaw Wang, Huatan Shiang (TW)

(73) Assignee: Industrial Technology Research Institute, Hsinchu (TW)

( * ) Notice: Subject to any disclaimer, the term of this patent is extended or adjusted under 35 U.S.C. 154(b) by 661 days.

(21) Appl. No.: 10/925,462

(22) Filed: Aug. 24, 2004

(65) Prior Publication Data

US 2005/0286648 A1    Dec. 29, 2005

(30) Foreign Application Priority Data

Jun. 28, 2004    (TW) ................ 93118795 A

(51) Int. Cl.
H04K 27/00    (2006.01)
H04L 25/03    (2006.01)
H04J 11/00    (2006.01)

(52) U.S. Cl. .................. 375/295; 375/297; 370/210
(58) Field of Classification Search ............... 375/260, 375/295, 296, 297, 259; 370/203, 210, 281, 370/276, 343, 319, 405; 708/403, 400, 404
See application file for complete search history.

(56) References Cited

U.S. PATENT DOCUMENTS

| 6,125,103 A | 9/2000 | Bauml et al. ............ 370/203 |
| 2003/0067866 A1 | 4/2003 | Jung ..................... 370/210 |
| 2003/0202460 A1* | 10/2003 | Jung et al. .............. 370/208 |
| 2004/0146115 A1* | 7/2004 | Feng et al. .............. 375/260 |
| 2005/0265468 A1* | 12/2005 | Fujii et al. .............. 375/260 |
| 2006/0193393 A1* | 8/2006 | Shen et al. .............. 375/260 |

OTHER PUBLICATIONS

Lim et al., "A PTS OFDM Scheme with Low Computational Complexity," Infor. Theory 2005 ISIT 2005, Proceedings International Symposium Sep. 4-9 2005, pp. 1141-1144.*
A.D.S.Jayalath, C.Tellambura and H. Wu, "Reduced complexity PTS and new phase sequences for SLM to reduce PAP of an OFDM signal", VTC2000, p. 1914-p. 1917, IEEE.
Leonard J. Cimini, Jr., Fellow IEEE, and Nelson R. Sollenberger, Fellow IEEE, "Peak-to-Average Power Ratio Reduction of an OFDM Signal Using Partial Transmit Sequences", IEEE Communications Letters. vol. 4. No. 3, Mar. 2000, p. 86-p. 88..

(Continued)

Primary Examiner—Tesfaldet Bocure

(57) ABSTRACT

A method and apparatus for high-order peak-to-average power ratio reduction of an OFDM signal are disclosed. The method partitions time-domain input data x[n] of length N into M disjoint subblocks in time domain, and a complete N-point transmitted signal $\tilde{x}[n]$, n=0, 1, ..., N−1, is composed after transformation, complex multiplication, and phase optimization, where M is a power of 2, $M \geq 8$ and N/M>1 is an integer. Accordingly, the apparatus comprises an N-point inverse fast Fourier transform (N-IFFT), a de-multiplexer, a transformer, two sets of memories, a plurality of complex multipliers, and an adder. This invention uses only one N-IFFT, whereby it achieves significant computation reduction. As M=8, the number of complex multiplications and that of memory units required are less than or equal to $(N/2)\log_2 N+(3N/4)$ and $3N/2$, respectively. The invention also preserves the inherent property as well as advantages of an OFDM system.

13 Claims, 16 Drawing Sheets

OTHER PUBLICATIONS

S.H. Muller and J.B.Huber, "OFDM with reduced peak-to-average power ratio by optimum combination of partial transmit sequences", Electronics Letters Feb. 27, 1997 vol. 33 No. 5 p. 368-p. 369.

G.Hill, M. Faulkner and J.Singh, "Cyclic Shifting and Time Inversion of Partial Transmit Sequences to Reduce the Peak-to-Average Power Ratio in OFDM", p. 1256-p. 1259, Electronics Letter.

Seog Geun Kang, Student Member, IEEE, Jeong Goo Kim, Member, IEEE, and Eon Kyeong Joo, Member, IEEE,"A Novel Subblock Partition Scheme for Partial Transmit Sequence OFDM", IEEE Transactions Broadcasting vol. 45, No. 3, Sep. 1999.p. 333-p. 338.

Stefan H. Muller and Johannes B. Huber, "A Novel Peak Power Reduction Scheme for OFDM", p. 1092-p. 1094, 1997, IEEE.

Chin-Chun Feng, Chih-Yaw Wang, Chun-Yu Lin, and Yung-Hua Hung, "Protection and Transmission of Side Information for Peak-to-Average Power Ratio Reduction of an OFDM Signal Using Partial Transmit Sequences", p. 2461-p. 2465, 2003, IEEE.

G.R. Hill, M. Faulkner and J.Singh,"Reducing the peak-to-average power ratio in OFDM by cyclically shifting partial transmit sequences", Electronics Letters Mar. 16, 2000 vol. 36 No. 6, p. 560-p. 561.

\* cited by examiner

| n | $\tilde{b}_1$ | $\tilde{b}_2$ | $\tilde{b}_3$ | $\tilde{b}_4$ | $\tilde{b}_5$ | $\tilde{b}_6$ | $\tilde{b}_7$ | $\tilde{b}_8$ |
|---|---|---|---|---|---|---|---|---|
| $0 \sim \frac{N}{8}-1$ | $b_1$ | $b_2$ | $b_3$ | $b_4$ | $b_5$ | $b_6$ | $b_7$ | $b_8$ |
| $\frac{2N}{8} \sim \frac{3N}{8}-1$ | $b_1$ | $jb_2$ | $-b_3$ | $-jb_4$ | $b_5$ | $jb_6$ | $-b_7$ | $-jb_8$ |
| $\frac{4N}{8} \sim \frac{5N}{8}-1$ | $b_1$ | $-b_2$ | $b_3$ | $-b_4$ | $b_5$ | $-b_6$ | $b_7$ | $-b_8$ |
| $\frac{6N}{8} \sim \frac{7N}{8}-1$ | $b_1$ | $-jb_2$ | $-b_3$ | $jb_4$ | $b_5$ | $-jb_6$ | $-b_7$ | $jb_8$ |

$n = \frac{pN}{8} \sim \frac{(p+1)N}{8}-1$, for $p=0, 2, 4, 6$

FIG. 12(a)

| n | $\tilde{b}_1$ | $\tilde{b}_2$ | $\tilde{b}_3$ | $\tilde{b}_4$ | $\tilde{b}_5$ | $\tilde{b}_6$ | $\tilde{b}_7$ | $\tilde{b}_8$ |
|---|---|---|---|---|---|---|---|---|
| $\frac{N}{8} \sim \frac{2N}{8}-1$ | $b_1$ | $b_2$ | $jb_3$ | $jb_4$ | $-b_5$ | $-b_6$ | $-jb_7$ | $-jb_8$ |
| $\frac{3N}{8} \sim \frac{4N}{8}-1$ | $b_1$ | $jb_2$ | $-jb_3$ | $jb_4$ | $-b_5$ | $-b_6$ | $jb_7$ | $-b_8$ |
| $\frac{5N}{8} \sim \frac{6N}{8}-1$ | $b_1$ | $-b_2$ | $jb_3$ | $-b_4$ | $-b_5$ | $b_6$ | $-jb_7$ | $b_8$ |
| $\frac{7N}{8} \sim N-1$ | $b_1$ | $-jb_2$ | $-jb_3$ | $-jb_4$ | $-b_5$ | $jb_6$ | $jb_7$ | $b_8$ |

$n = \frac{pN}{8} \sim \frac{(p+1)N}{8}-1$, for $p=1, 3, 5, 7$

$n = \frac{pN}{8} \sim \frac{(p+1)N}{8} - 1$, for $p=0, 2, 4, 6$

| n | $\tilde{b}_1$ | $\tilde{b}_2$ | $\tilde{b}_3$ | $\tilde{b}_4$ | $\tilde{b}_5$ | $\tilde{b}_6$ | $\tilde{b}_7$ | $\tilde{b}_8$ |
|---|---|---|---|---|---|---|---|---|
| $0 \sim \frac{N}{8}-1$ | $b_1$ | $b_2$ | $b_3$ | $b_4$ | $b_5$ | $jb_2$ | $b_7$ | $-jb_4$ |
| $\frac{2N}{8} \sim \frac{3N}{8}-1$ | $b_1$ | $jb_2$ | $-b_3$ | $-jb_4$ | $b_5$ | $-b_2$ | $b_7$ | $-b_4$ |
| $\frac{4N}{8} \sim \frac{5N}{8}-1$ | $b_1$ | $-b_2$ | $b_3$ | $-b_4$ | $b_5$ | $-jb_2$ | $b_7$ | $jb_4$ |
| $\frac{6N}{8} \sim \frac{7N}{8}-1$ | $b_1$ | $-jb_2$ | $-b_3$ | $jb_4$ | $b_5$ | $b_2$ | $-b_7$ | $b_4$ |

FIG. 15(b)

$n = \frac{pN}{8} \sim \frac{(p+1)N}{8} - 1$, for $p=1, 3, 5, 7$

| n | $\tilde{b}_1$ | $\tilde{b}_2$ | $\tilde{b}_3$ | $\tilde{b}_4$ | $\tilde{b}_5$ | $\tilde{b}_6$ | $\tilde{b}_7$ | $\tilde{b}_8$ |
|---|---|---|---|---|---|---|---|---|
| $\frac{N}{8} \sim \frac{2N}{8}-1$ | $b_1$ | $b_2$ | $jb_3$ | $b_4$ | $-b_5$ | $jb_2$ | $-jb_7$ | $-jb_4$ |
| $\frac{3N}{8} \sim \frac{4N}{8}-1$ | $b_1$ | $jb_2$ | $-jb_3$ | $-jb_4$ | $-b_5$ | $-b_2$ | $jb_7$ | $-b_4$ |
| $\frac{5N}{8} \sim \frac{6N}{8}-1$ | $b_1$ | $-b_2$ | $jb_3$ | $-b_4$ | $-b_5$ | $-jb_2$ | $-jb_7$ | $jb_4$ |
| $\frac{7N}{8} \sim N-1$ | $b_1$ | $-jb_2$ | $-jb_3$ | $jb_4$ | $-b_5$ | $b_2$ | $jb_7$ | $b_4$ |

8 subblocks

| size of IFFT | original PTS | | Kang, Kim & Joo | | Samsung | | preferred embodiment of the invention | | simplified embodiment of the invention | |
|---|---|---|---|---|---|---|---|---|---|---|
| | no. of multiplications | no. of memory unit | no. of multiplications | no. of memory unit | no. of multiplications | no. of memory unit | no. of multiplications | no. of memory unit | no. of multiplications | no. of memory unit |
| 64 | 1536 | 512 | 608 | 512 | 160 | 64 | 240 | 96 | 192 | 64 |
| 256 | 8192 | 2048 | 2688 | 2048 | 896 | 256 | 1216 | 384 | 1024 | 256 |
| 1024 | 40960 | 8192 | 11776 | 8192 | 4608 | 1024 | 5888 | 1536 | 5120 | 1024 |
| 2048 | 90112 | 16384 | 24576 | 16384 | 10240 | 2048 | 12800 | 3072 | 11264 | 2048 |

FIG. 16

METHOD AND APPARATUS FOR HIGH-ORDER PAPR REDUCTION OF AN OFDM SIGNAL

FIELD OF THE INVENTION

The present invention generally relates to a method for solving the problem of peak-to-average power ratio (PAPR) of an orthogonal frequency division multiplexing (OFDM) signal at transmission side, and more specifically to a method for high-order PAPR reduction of an OFDM signal, and an apparatus of performing the same.

BACKGROUND OF THE INVENTION

Multicarrier communication systems such as discrete multitone (DMT) and OFDM systems have attracted much attention in the applications of high-speed communication. The advantages of the multicarrier communication system lie in partitioning a high speed data stream into a plurality of parallel data streams, each transmitted by a subcarrier. As such, each data stream is transmitted at low speed, and thus has a stronger capability in anti-multipath channel effect and narrow band interference.

FIG. 1 shows a block diagram of a conventional OFDM transmitter. In the OFDM transmitter, the input data X[k], k=0, 1, ..., N−1, are transmitted in an OFDM symbol period, where N is the number of useful data in an OFDM symbol. After the serial/parallel transformation, N-point inverse fast Fourier transform (N-IFFT), and parallel/serial transformation, the input data are transformed into the following discrete time sequence:

$$x[n] = \frac{1}{\sqrt{N}} \sum_{k=0}^{N-1} X[k] W_N^{kn}, \quad n = 0, 1, \ldots, N-1 \quad (1)$$

where $$W_N \equiv e^{j2\pi/N} \quad (2)$$

is the twiddle factor. The discrete time sequence x[n] obtained from equation (1) undergoes the cyclic prefix insertion and digital/analog transformation to obtain an analog signal x(t). The analog signal x(t) is then transmitted to the RF front end for further processing, including an IQ modulation, an up conversion, and a power amplification. The PAPR of the analog signal x(t) is several dB higher than the PAPR of the corresponding discrete time sequence x[n], and is close to the PAPR of x[n/R]. where x[n/R] represents the sequence obtained by R times oversampling of x[n]. Therefore, the PAPR of x(t) can be approximated by using x[n/R] as follows:

$$PAPR = \frac{\max_{0 \le n \le RN-1} |x[n/R]|^2}{E\{|x[n/R]|^2\}} \quad (3)$$

Where $E\{\cdot\}$ is the expectation operation. The approximation is relatively accurate when R≥4. However, one of the main disadvantages of multicarrier communication systems is the high PAPR of the modulated signal. When the modulated signal with a high PAPR passes through the RF front end, the signal is distorted due to the non-linearity of a regular RF amplifier. The non-linearity not only causes the in-band signal distortion which leads to the increase of the bit error rate (BER), but also causes the out-of-band radiation which leads to the interference of adjacent channels, a violation of the government regulation. A straightforward solution to this problem would be using an RF amplifier with a larger linear range. However, the aforementioned solution will lead to the reduction of power efficiency, higher power consumption and a higher manufacturing cost.

There are several conventional methods for solving the aforementioned problem. Among these methods, the partial transmit sequences (PTS) is most attractive due to its relatively low realization complexity and capability in PAPR reduction. Ericsson (U.S. Pat. No. 6,125,103) disclosed a method for using PTS to solve the high PAPR of the signal at the OFDM transmission end, as shown in FIG. 2. The explanation is as follows.

First, the input data X[k] of length N is partitioned in the frequency domain into M disjoint subblocks, represented by $X_1[k], X_2[k], \ldots, X_M[k]$, k=0, 1, ..., N−1. The partition can be interleaved, adjacent, or irregular, as shown in FIG. 3 (using M=8 as an example). The M disjoint subblocks are phase-rotated and added to form the following signal:

$$\tilde{X}[k] = \sum_{m=1}^{M} b_m X_m[k], \quad k = 0, 1, \ldots, N-1 \quad (4)$$

where $b_m$ is the phase rotation parameter of the m-th subblock (m∈{1, 2, ..., M}) and $|b_m|=1$.

Equation (4), after the N-IFFT, becomes:

$$\tilde{x}[n] = \sum_{m=1}^{M} b_m x_m[n], \quad n = 0, 1, \ldots, N-1 \quad (5)$$

where $x_m[n]$ is the result of the N-IFFT of the $X_m[k]$. In the PAPR reduction, the object of the PTS method is the phase optimization, i.e., seeking for the optimal sequence $\{b_1, b_2, \ldots, b_M\}$ so that the PAPR of the transmitted signal is minimum. In practice, the phase of $b_m$ is usually restricted to one of the four possibilities $\{+1, -1, +j, -j\}$ so that no multiplication operation is required in the phase rotation.

From FIG. 2, it can be seen that an N-point OFDM symbol requires M times of N-IFFT operation. That is, a total of $M \cdot (N/2) \log_2 N$ complex multiplications are required. Several methods are further devised to reduce the amount of computation required in the PTS method. Kang, Kim and Joo, in their article "A Novel Subblock Partition Scheme for Partial Transmit Sequence OFDM," IEEE Trans. Broadcasting, vol. 45, no. 3, pp. 333-338, September 1999, disclosed a method of using the characteristics of the PTS interleaved partition of the subblocks, as shown in FIG. 4 (M=8). Each subblock has N points in the frequency domain, but only L points of them have non-zero values (L=N/M). Therefore, the N-IFTT on the N-point subblock $X_m[k]$ is equivalent to the L-IFFT on the L-point subblock (where $X_m[k]$ has non-zero values), repeating M times in the time domain to form the N-point signal, and multiplying the N-point signal with the N-point complex coefiicients:

$$(1/M) \cdot e^{j2\pi mn/N}, \text{ m=0, 1, \ldots, M-1, n=0, 1, \ldots, N-1}$$

This method takes M·(L/2)log$_2$ L+MN multiplications, and requires MN units of memory space.

Samsung (US. Patent publication 2003/0,067,866) disclosed a similar method, as shown in FIG. 5. The Samsung method differs from the previous method in no repetition after the L-IFFT on an L-point subblock. Instead, the multiplication of the L-point complex coefficients in the time domain is performed to make the time domain subblocks orthogonal so that the receiving end can separate each subblock. As there are only L points in each time domain subblock, the PAPR is lower and, therefore, the PAPR of the transmitted signal after the phase rotation and the addition is also lower. Although this method takes M·(L/2)log$_2$ L+N multiplications and requires N units of memory space, this method reduces the length of the OFDM signal from N to L, which means that the capability of anti-multipath channel effect is also greatly reduced. Furthermore, the L-point complex coefficient multiplier to make the time domain subblocks orthogonal is hard to design and may not exist for most applications. This will further make the receiving end more difficult in obtaining the original transmitted data.

SUMMARY OF THE INVENTION

The present invention has been made to overcome the aforementioned drawback of the conventional PTS methods for PAPR reduction of the OFDM transmission end. The primary object of the present invention is to provide a high-order PAPR reduction method and apparatus for the OFDM signal.

The high-order PAPR reduction method according to the present invention includes the following steps: (1) using the N-IFFT to transform the frequency domain signal X[k] of length N into the time domain signal x[n] of length N, where N is the number of useful data in an OFDM symbol, and k, n=0, 1, . . . , N−1; (2) partitioning the time domain signal x[n] of length N into M disjoint subblocks, each subblock having the length of N/M, M being a power of 2, M being greater or equal to 8, and N/M being an integer greater than 1; (3) transforming the M subblocks into M sub-sequences $z_l[n]$, each having the length of N/M, where l=1, 2, . . . , M, and n=0, 1, . . . , (N/M)−1; (4) using fixed-phase rotation to rotate M sub-sequences $z_l[n]$ and obtain M sub-sequences $\tilde{z}_l[n]$, each having the length of N/M, where l=1, 2, . . . , M, and n=0, 1, . . . , (N/M)−1; and (5) using the phase rotation, phase optimization, and addition to obtain a complete N-point signal $\tilde{x}[n]$ having the length of N.

Because not all the fixed-phase rotations require multiplier, the present invention of a high-order PAPR reduction apparatus for OFDM signal includes an N-point inverse fast Fourier transform (N-IFFT), a de-multiplexer, two set of memories, a transformer, at most M complex multipliers, and an adder. The N-IFFT transforms the input frequency domain signal X[k] into the time domain signal x[n]. The de-multiplexer uses the adjacent partitioning to partition x[n] into M disjoint subblocks of identical length. The transformer transforms the M disjoint subblocks into M sub-sequences $z_l[n]$ of length N/M, where l=1, 2, . . . , M and n=0, 1, . . . (N/M)−1. Some of the sub-sequences $z_l[n]$ are complex multiplied and phase rotated, and the remaining sub-sequences $z_l[n]$ are directly phase rotated. Finally, the adder adds them to obtain a complete N-point signal $\tilde{x}[n]$.

For explanation, the present invention uses a preferred embodiment and a simplified embodiment of M=8.

The present invention only uses one N-IFFT so that the amount of computation is greatly reduced. In the preferred embodiment, the present invention takes (N/2)log$_2$N+(3N/4) complex multiplications and requires 3N/2 units of memory space. In the simplified embodiment, the present invention takes (N/2)log$_2$N complex multiplications and requires N units of memory space. But more important, the present invention keeps the original capability of anti-multipath channel effect in the OFDM system.

When M=8, the present invention shows different results in terms of computation amount and memory requirement, compared to the other three PTS methods. Compared to the original PTS method and the method disclosed by Kang, Kim and Joo, the simplified embodiment of the present invention and the Samsung's method use the least memory space. While the amount of multiplication is slightly higher or equal to that required by the Samsung's method, the present invention does not require shortening the length of the OFDM symbol, and therefore keeps the features and advantages of the OFDM system.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 12(a) and FIG. 12(b) show the phase rotation parameter setting in FIG. 10.

FIG. 15(a) and FIG. 15(b) show the phase rotation parameter setting in FIG. 13.

FIG. 16 shows the comparison of the computation amount and the memory requirement between the present invention and the other three methods.

DETAILED DESCRIPTION OF THE PREFERRED EMBODIMENTS

Figure 6:
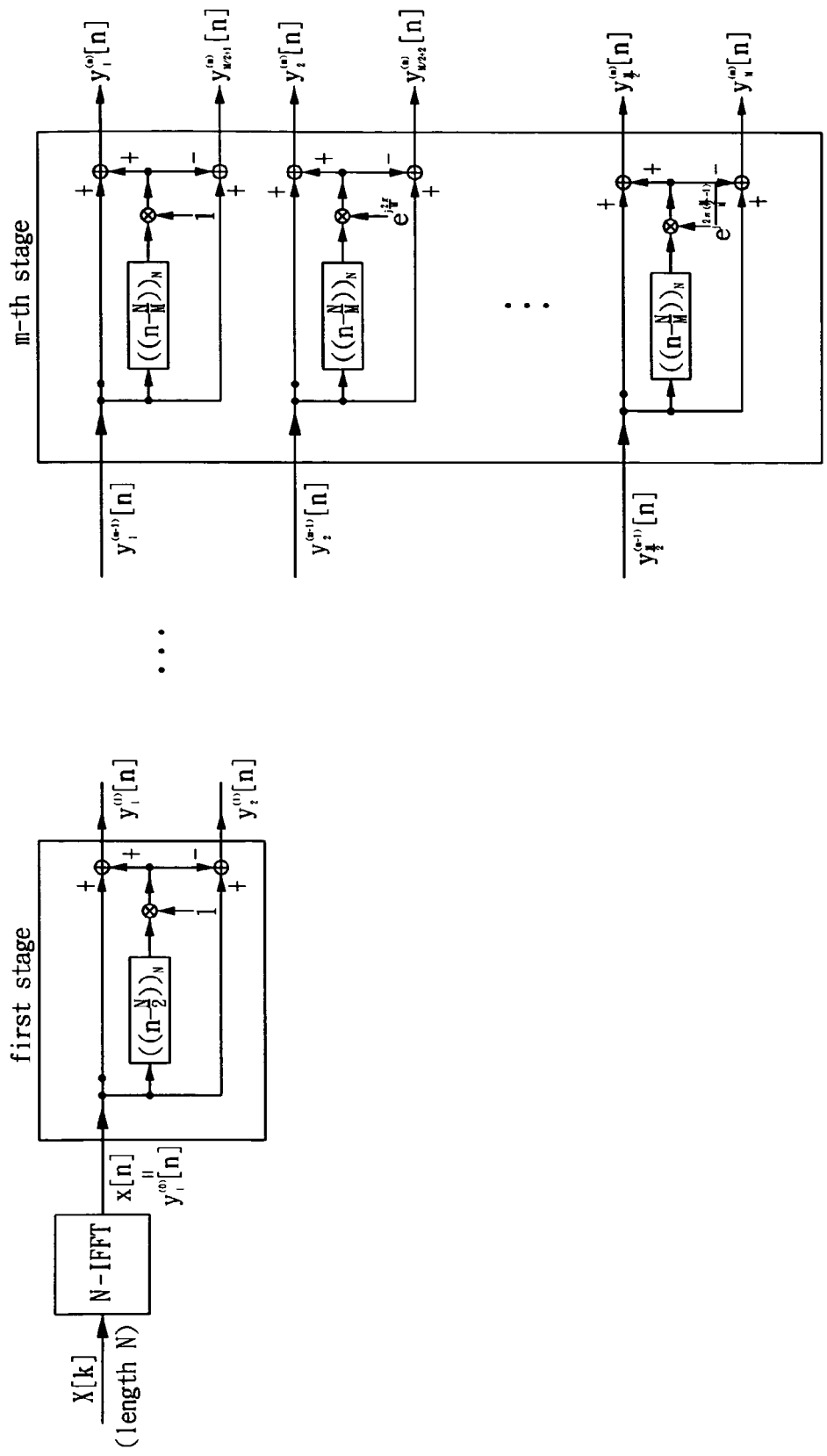
FIG. 6 shows a schematic view of a multi-stage time domain signal partitioning.

FIG. 6 shows a schematic view of a multi-stage time domain signal partitioning having m stages. The number of time domain signals after partitioning is M=2$^m$. The N-IFFT is performed on the frequency domain signal X[k] of length N to obtain a time domain signal x[n]. Assume the initial value to be:

$$y_1^{(0)}[n]=x[n] \quad (6)$$

At the first stage, the following equations can be used to partition x[n] into two disjoint signals:

$$\begin{cases} y_1^{(1)}[n] = y_1^{(0)}[n] + y_1^{(0)}\left[\left(\left(n - \frac{N}{2}\right)\right)_N\right] \\ y_2^{(1)}[n] = y_1^{(0)}[n] - y_1^{(0)}\left[\left(\left(n - \frac{N}{2}\right)\right)_N\right] \end{cases} \quad (7)$$

where the notation '$((n))_N$' represents '(n modulo N)', n=0, 1, . . . , N−1. In the same way, the two disjoint signals can be further partitioned into four disjoint signals. Repeating this step until the m-th stage, the following equations can be obtained for the M disjoint signals:

$$\begin{cases} y_1^{(m)}[n] = y_1^{(m-1)}[n] + y_1^{(m-1)}\left[\left(\left(n - \frac{N}{M}\right)\right)_N\right] \\ y_{(M/2)+1}^{(m)}[n] = y_1^{(m-1)}[n] - y_1^{(m-1)}\left[\left(\left(n - \frac{N}{M}\right)\right)_N\right] \end{cases} \quad (8)$$

$$\begin{cases} y_2^{(m)}[n] = y_2^{(m-1)}[n] + e^{j\frac{2\pi}{M}} \cdot y_2^{(m-1)}\left[\left(\left(n - \frac{N}{M}\right)\right)_N\right] \\ y_{(M/2)+2}^{(m)}[n] = y_2^{(m-1)}[n] - e^{j\frac{2\pi}{M}} \cdot y_2^{(m-1)}\left[\left(\left(n - \frac{N}{M}\right)\right)_N\right] \end{cases}$$

$$\vdots$$

$$\begin{cases} y_{M/2}^{(m)}[n] = y_{M/2}^{(m-1)}[n] + e^{j\frac{2\pi\left(\frac{M}{2}-1\right)}{M}} \cdot y_{M/2}^{(m-1)}\left[\left(\left(n - \frac{N}{M}\right)\right)_N\right] \\ y_M^{(m)}[n] = y_{M/2}^{(m-1)}[n] - e^{j\frac{2\pi\left(\frac{M}{2}-1\right)}{M}} \cdot y_{M/2}^{(m-1)}\left[\left(\left(n - \frac{N}{M}\right)\right)_N\right] \end{cases}$$

This is the result of time domain signal partitioning required prior to the PTS phase rotation.

Figure 7:
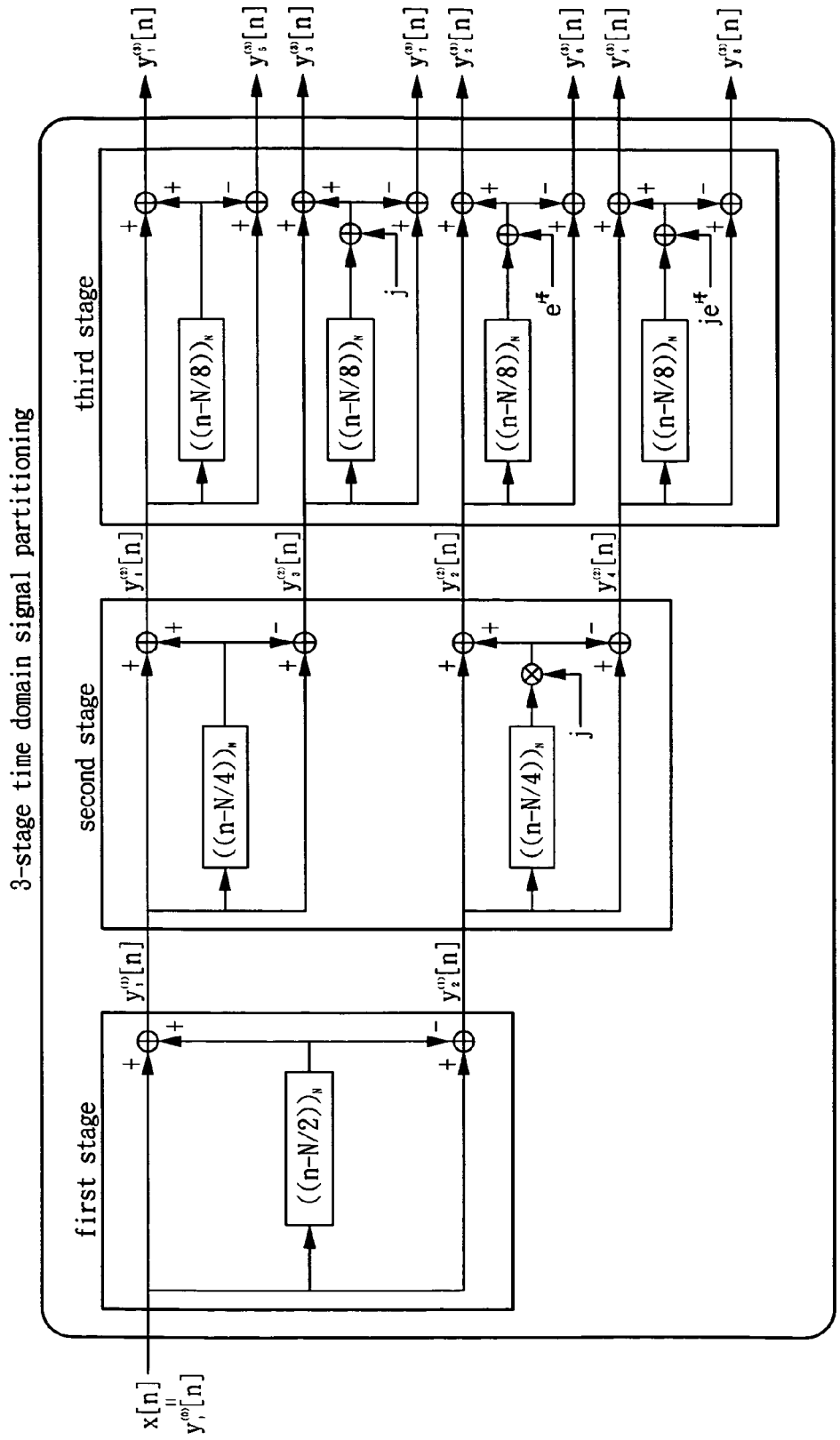
FIG. 7 shows a schematic view of 3-stage time domain signal partitioning when M=8.

Based on the multi-stage signal partitioning of FIG. 6, FIG. 7 shows a schematic view of M=8. According to the previous procedure, the 3-stage partitioning for M=8 requires $(N/2)\log_2(N)+2N$ multiplications, and 8N units of memory. Based on the same concept, the following description of a high-order PAPR reduction method for OFDM signals uses the symmetric characteristics of the M disjoint signals to lower the amount of multiplication and memory requirement.

Figure 8:
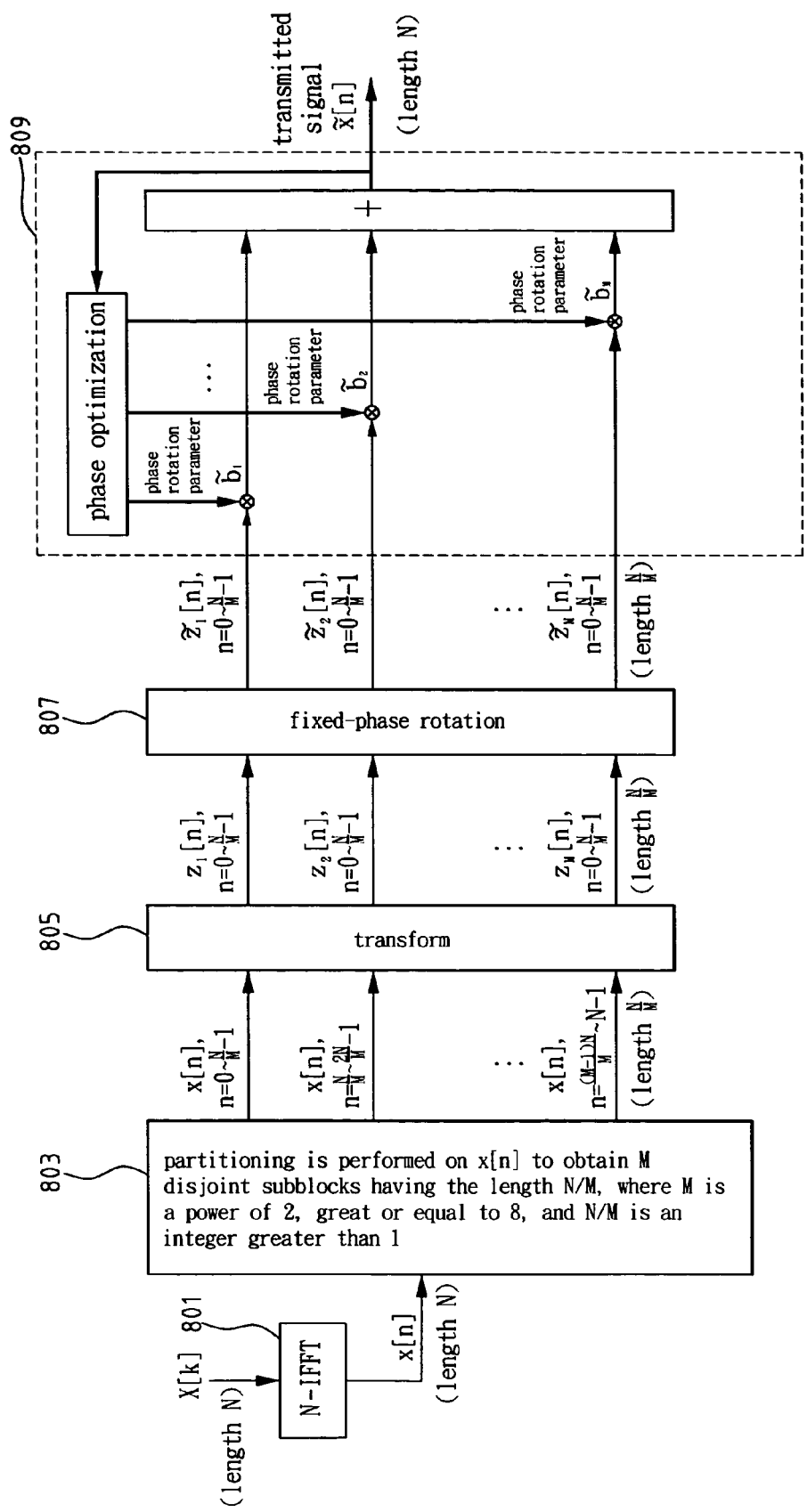
FIG. 8 shows the high-order PAPR reduction method of OFDM signal of the present invention.

Substituting equation (6) and the first stage equation (i.e., (7)) up to (m−1)th stage equation into equation (8), the M time domain input subblocks {x[n], n=0~(N/M)−1}, {x[n], n=2N/M~(2N/M)−1}, . . . , {x[n], n=(M−1)N/M~N−1} can be obtained to represent M disjoint time domain signals. Using the symmetric characteristics to process the above subblocks, the method of high-order PAPR reduction for OFDM signals can be obtained, as shown in FIG. 8. First, the N-IFFT 801 is performed on the frequency domain signal X[k] of length N to obtain the time domain signal x[n] of length N. The adjacent partitioning is performed on x[n] to obtain M disjoint subblocks having the length N/M, where M is a power of 2, great or equal to 8, and N/M is an integer greater than 1, as in step 803. In step 805, a transformer is used to transform the M disjoint subblocks into M sub-sequences $z_l[n]$, each having the length N/M, l=1, 2, . . . , M and n=0, 1, . . . , (N/M)−1. In step 807, the fixed-phase rotation is used to rotate the M sub-sequences $z_l[n]$ to obtain M sub-seuqneces $\tilde{z}_l[n]$, each having the length of N/M, =1, 2, . . . , M and n=0, 1, . . . , (N/M)−1. Finally, in step 809, the M sub-sequences $\tilde{z}_l[n]$, after phase rotation and phase optimization, are added to form a complete N-point transmitted signal $\tilde{x}[n]$, where n=0, 1, . . . , N−1.

Figure 9:
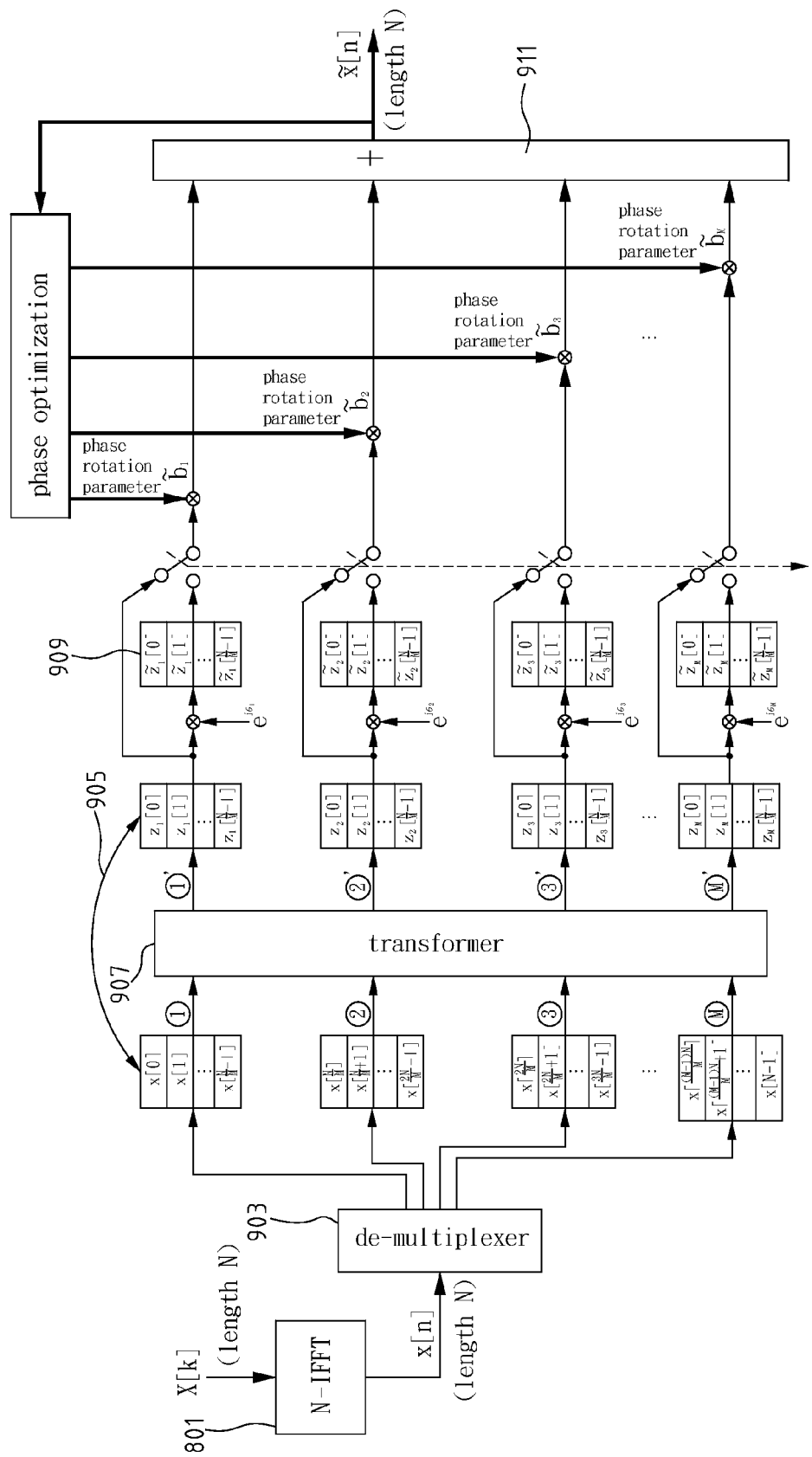
FIG. 9 shows the schematic view of the apparatus of the present invention for high-order PAPR reduction of the OFDM signal.

In step 807, not all of the fixed-phase rotations require a complex multiplier, therefore, FIG. 9 shows a schematic view of a preferred embodiment of a high-order PAPR reduction apparatus of the present invention. The apparatus includes an N-IFFT 801, a de-multiplexer 903, two sets of memories 905, 909, a transformer 907, at most M complex multipliers (for fixed-phase rotations), and an adder 911. N-IFFT 801 transforms the input frequency domain signal X[k] into the time domain signal x[n]. De-multiplexer 903 partitions x[n] into M adjacent, yet disjoint, subblocks {x[n], n=0~(N/M)−1}{x[n], n=N/M~(2N/M)−1}, . . . , {x[n], n=(M−1)N/M~N−1} of the identical length N/M, stored in memory 905. The M subblocks are transformed by transformer 907 into M sub-sequences $z_l[n]$, each having length N/M, l=1, 2, . . . , M and n=0, 1, . . . , (N/M)−1, also stored in memory 905. Some of the M sub-sequences $z_l[n]$ are passed through complex multiplier $e^{j\Theta l}$ to form another sub-sequences $\tilde{z}_l[n]$, stored in memory 909, where l is between 1 and M, n=0, 1, . . . , (N/M)−1. The next step is to select sub-sequence z[n] or $\tilde{z}_l[n]$ for phase rotation according to different time period. Finally, adder 911 adds them to form a complete N-point signal $\tilde{x}[n]$, where n=0, 1, . . . , N−1.

Figure 10:
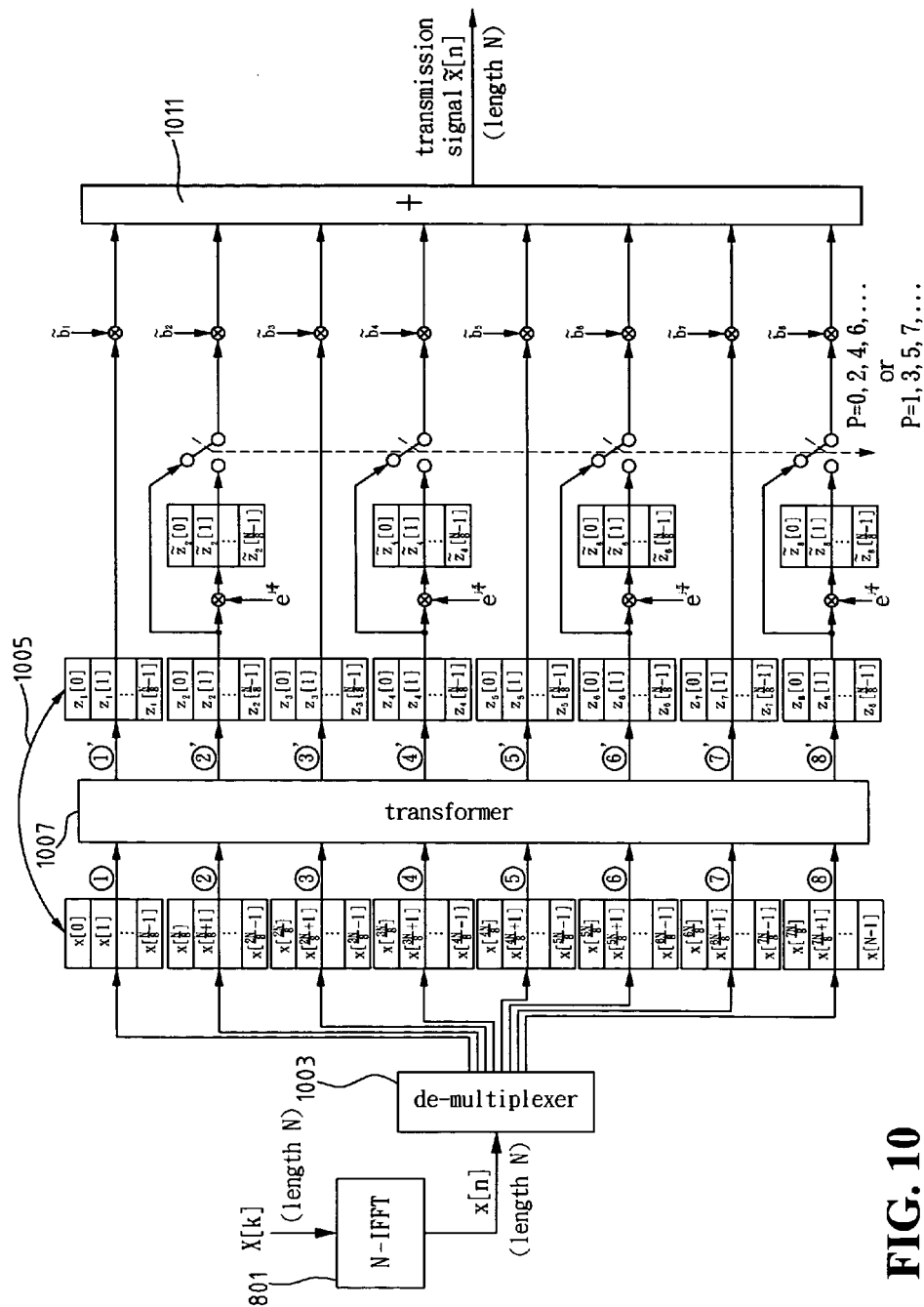
FIG. 10 shows an embodiment of the present invention in FIG. 9 when M=8.

Using M=8 as an example, FIG. 10 shows a schematic view. The input signal X[k] is transformed into x[n] by N-IFFT 801. De-multiplezer 1003 takes x[n], n=0, 1, . . . , N−1 and partitions into eight subblocks {x[n], n=0~(N/8)−1}, {x[n], n=N/8~(2N/8)−1}, . . . , {x[n], n=7N/8~N−1}, each having length N/8, stored in memory 1005. Transformer 1007 transforms the eight subblocks into eight sub-sequences $z_1[n], z_2[n], \ldots, z_8[n]$. According equations (6), (7), and (8), the following equations can be obtained:

$$z_1[n] = x[n] + x[((n - N/2))_N] + x[((n - N/4))_N] + \quad (9a)$$
$$x[((n - 3N/4))_N] + x[((n - N/8))_N] +$$
$$x[((n - 5N/8))_N] + x[((n - 3N/8))_N] + x[((n - 7N/8))_N]$$

$$z_5[n] = x[n] + x[((n - N/2))_N] + x[((n - N/4))_N] + \quad (9b)$$
$$x[((n - 3N/4))_N] - x[((n - N/8))_N] -$$
$$x[((n - 5N/8))_N] - x[((n - 3N/8))_N] - x[((n - 7N/8))_N]$$

$$z_3[n] = x[n] + x[((n - N/2))_N] - \quad (9c)$$
$$x[((n - N/4))_N] - x[((n - 3N/4))_N] +$$
$$jx[((n - N/8))_N] + jx[((n - 5N/8))_N] -$$
$$jx[((n - 3N/8))_N] - jx[((n - 7N/8))_N]$$

$$z_7[n] = x[n] + x[((n - N/2))_N] - \quad (9d)$$
$$x[((n - N/4))_N] + x[((n - 3N/4))_N] -$$
$$jx[((n - N/8))_N] - jx[((n - 5N/8))_N] +$$
$$jx[((n - 3N/8))_N] + jx[((n - 7N/8))_N]$$

-continued $$z_2[n] = x[n] - x[((n-N/2))_N] + \qquad (9e)$$
$$jx[((n-N/4))_N] - jx[((n-3N/4))_N] +$$
$$e^{j\frac{\pi}{4}}\{x[((n-N/8))_N] - x[((n-5N/8))_N] +$$
$$jx[((n-3N/8))_N] - jx[((n-7N/8))_N]\}$$

$$z_6[n] = x[n] - x[((n-N/2))_N] + \qquad (9f)$$
$$jx[((n-N/4))_N] - jx[((n-3N/4))_N] +$$
$$e^{j\frac{\pi}{4}}\{-x[((n-N/8))_N] + x[((n-5N/8))_N] -$$
$$jx[((n-3N/8))_N] + jx[((n-7N/8))_N]\}$$

$$z_4[n] = x[n] - x[((n-N/2))_N] - \qquad (9g)$$
$$jx[((n-N/4))_N] + jx[((n-3N/4))_N] + e^{j\frac{\pi}{4}}$$
$$\{jx[((n-N/8))_N] - jx[((n-5N/8))_N] +$$
$$x[((n-3N/8))_N] - x[((n-7N/8))_N]\}$$

$$z_8[n] = x[n] - x[((n-N/2))_N] - \qquad (9h)$$
$$jx[((n-N/4))_N] + jx[((n-3N/4))_N] + e^{j\frac{\pi}{4}}$$
$$\{-jx[((n-N/8))_N] + jx[((n-5N/8))_N] -$$
$$x[((n-3N/8))_N] + x[((n-7N/8))_N]\}$$

Figure 1:
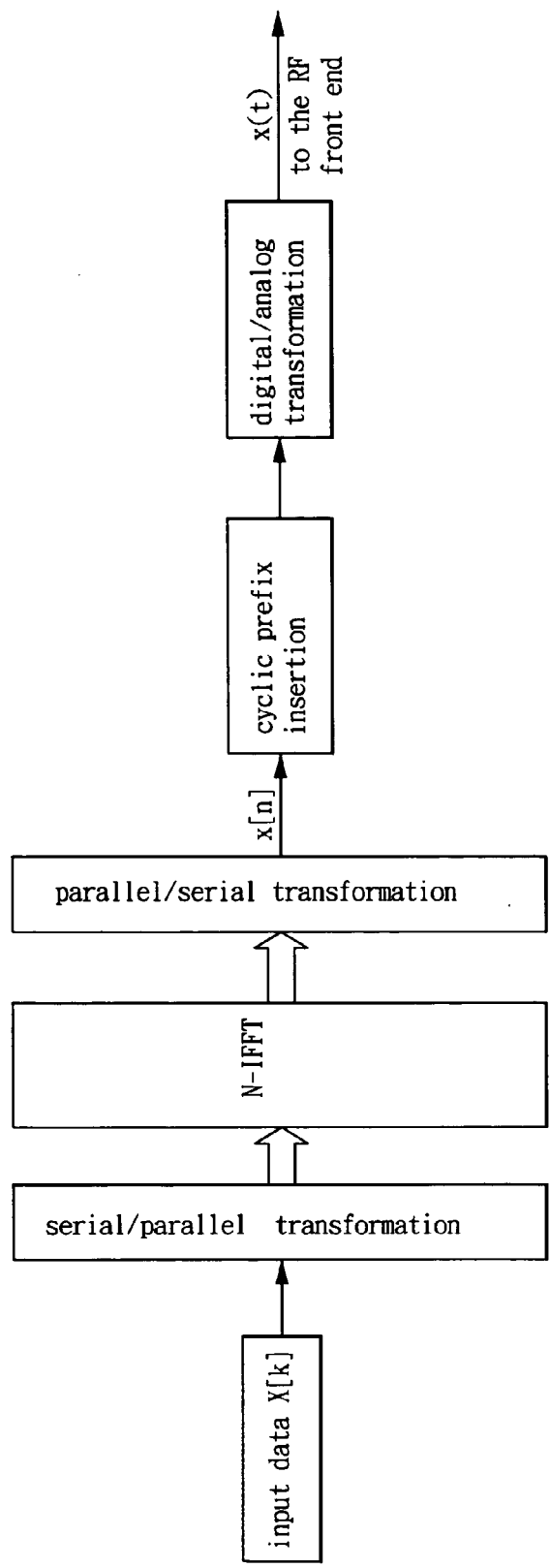
FIG. 1 shows a schematic view of a conventional multi-carrier communication system related to OFDM transmitter.
Figure 2:
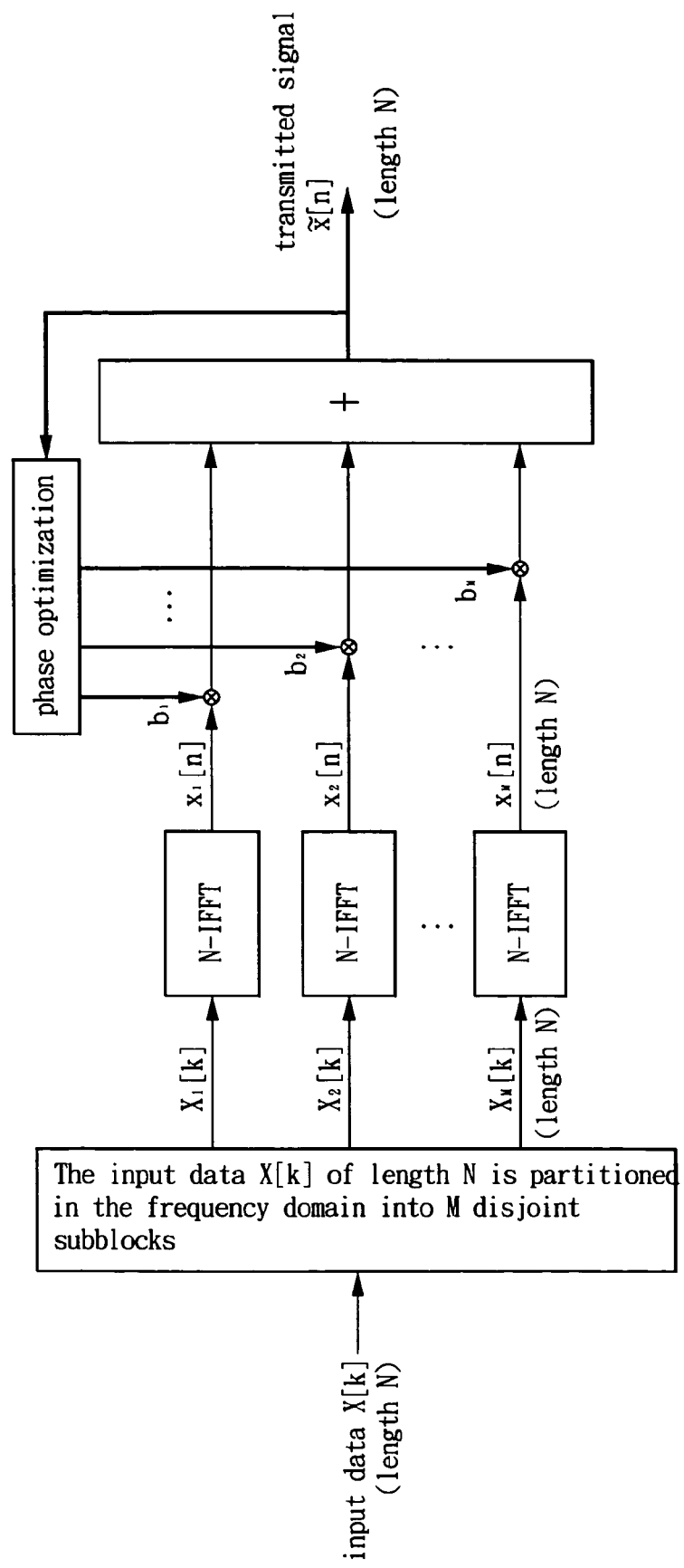
FIG. 2 shows a PTS method to solve the high PAPR problem of OFDM signal at transmission end.
Figure 3:
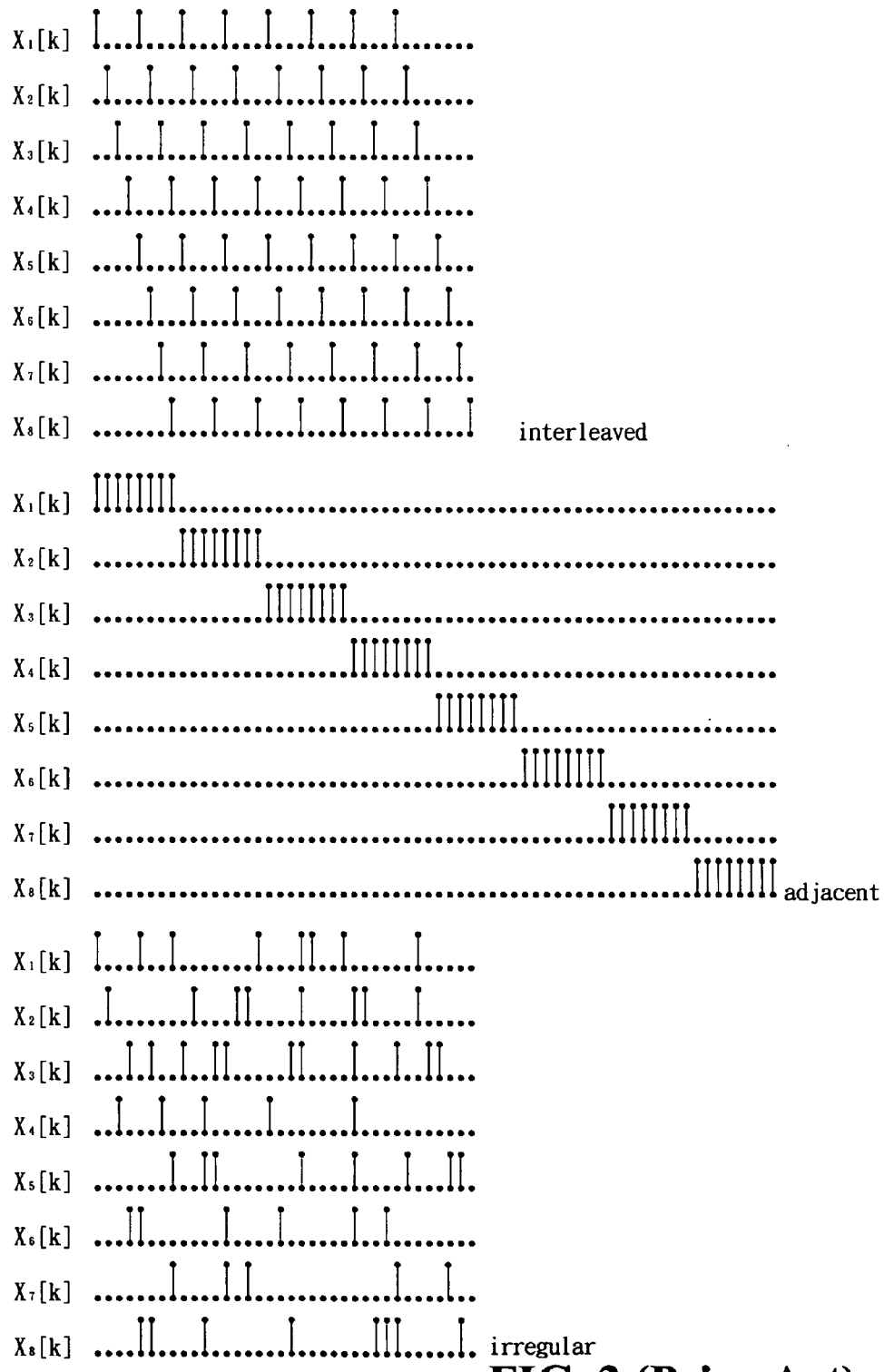
FIG. 3 shows the three ways of partitioning the input data X[k] into subblocks using M=8.
Figure 4:
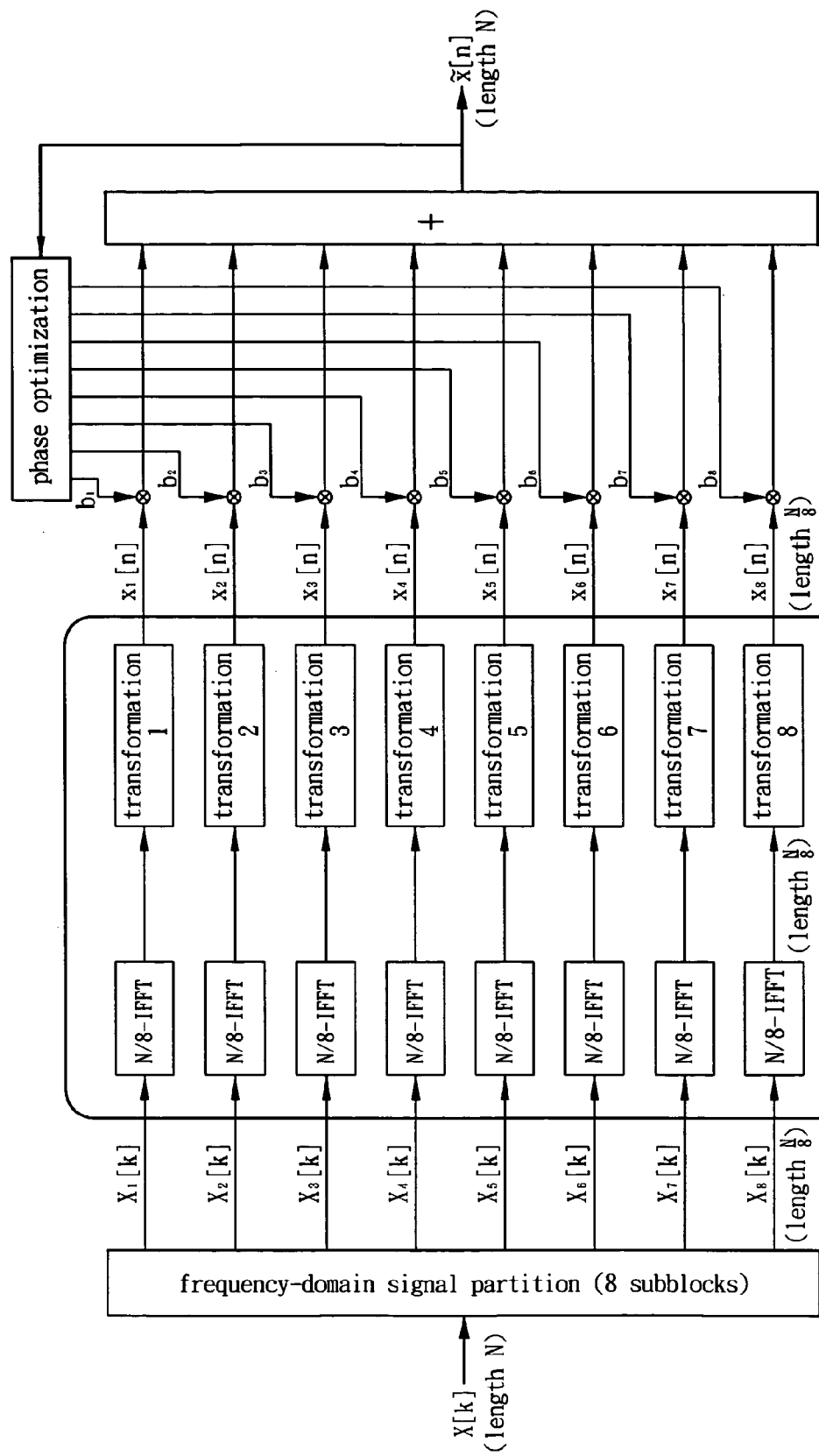
FIG. 4 shows the embodiment of the method proposed by Kang, Kim and Joo to reduce the computation amount of PTS.
Figure 5:
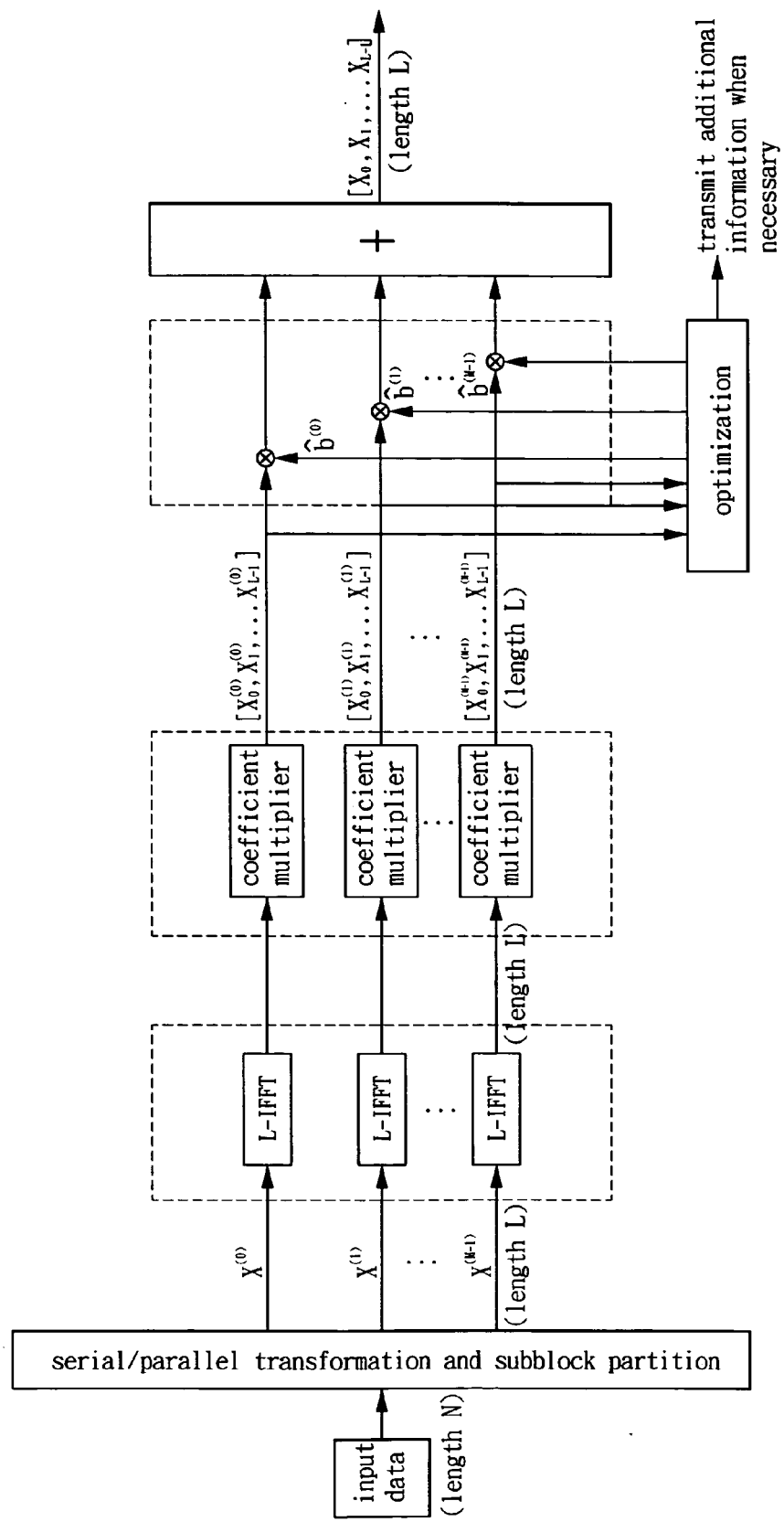
FIG. 5 shows the embodiment of the method proposed by Samsung to reduce the computation amount and memory requirement of PTS.
Figure 11:
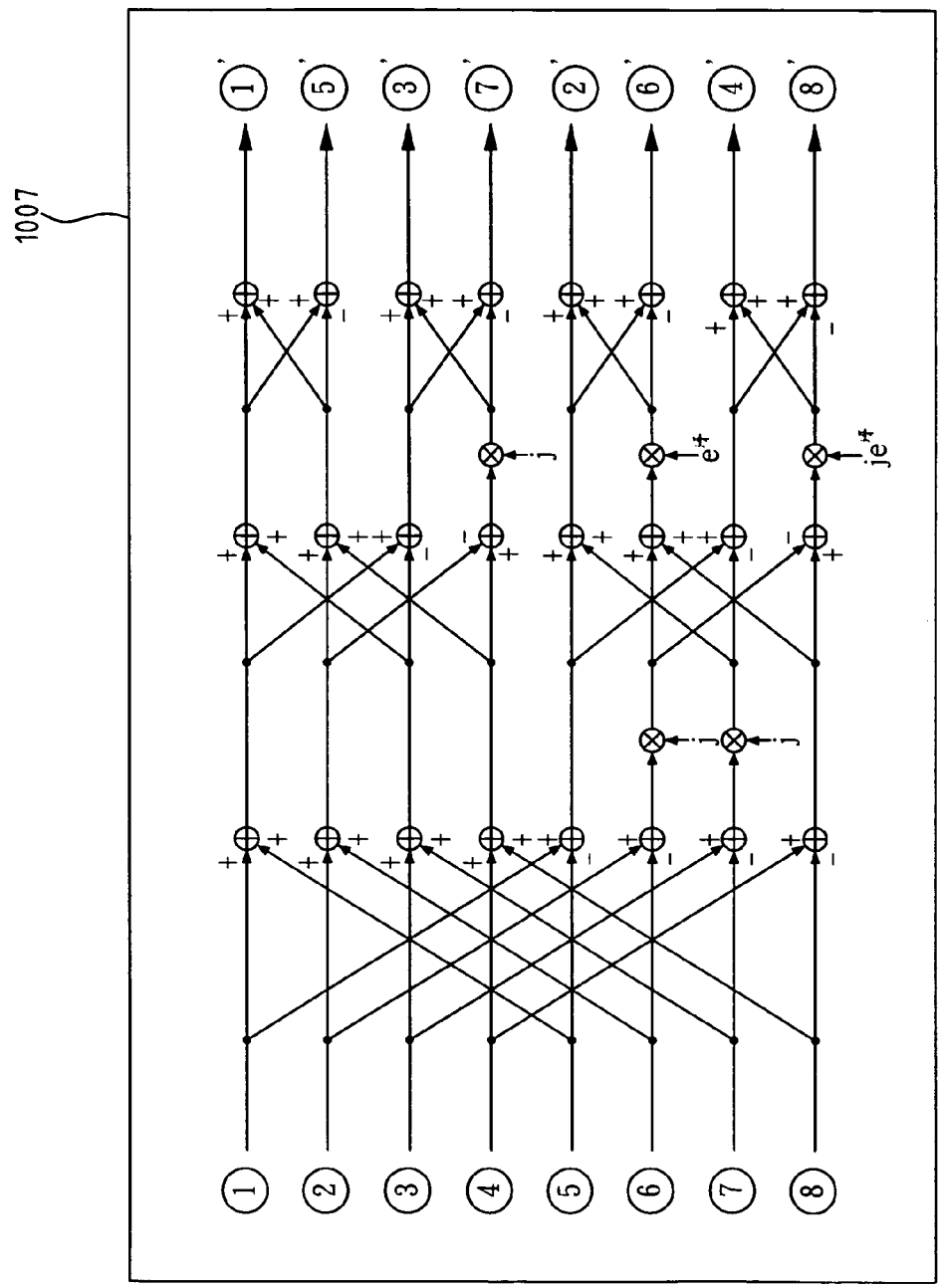
FIG. 11 shows the transformer of FIG. 10.

Accordingly, a schematic view of transformer 1007 of FIG. 10 can be shown in FIG. 11. As shown in FIG. 11, transformer 1007 uses 24 adders, 3 imagery j multipliers, and 2 complex multipliers to implement equations (9a)-(9h). It has a similar structure as 8-IFFT. It can be proven that the sub-sequences $z_1[n], z_2[n], \ldots, z_8[n]$ in equations (9a)-(9h) are identical to the time sequences $x_1[n], x_2[n], \ldots, x_8[n]$ obtained from the original PTS method shown in FIG. 2. Therefore, equation (5) can be rewritten as:

$$\tilde{x}[n] = \sum_{l=1}^{8} b_l z_l[n], \quad n = 0, 1, \ldots, N-1 \qquad (10)$$

Assuming equations (11a)-(11d) as follows:

$$\tilde{z}_2[n] = e^{j\frac{\pi}{4}} \cdot z_2[n] \qquad (11a)$$

$$\tilde{z}_4[n] = e^{j\frac{\pi}{4}} \cdot z_4[n] \qquad (11b)$$

$$\tilde{z}_6[n] = e^{j\frac{\pi}{4}} \cdot z_6[n] \qquad (11c)$$

$$\tilde{z}_8[n] = e^{j\frac{\pi}{4}} \cdot z_8[n] \qquad (11d)$$

and using equations (9a)-(9h) and equations (11a)-(11d), the following symmetry can be obtained, that is the relationship between the sub-sequences $\{z_1[((n+pN/8))_N], z_2[((n+pN/8))_N], \ldots, z_8[((n+pN/8))_N]\}$ having different time shift and the sub-sequences $\{z_1[n], z_2[n], \ldots, z_8[n]\}$.

$$p = 1, n = pN/8 \sim [(p+1)N/8] - 1: \qquad (12)$$

$$\begin{cases} z_1[((n+\frac{N}{8}))_N] = z_1[((n-\frac{7N}{8}))_N] = z_1[n] \\ z_2[((n+\frac{N}{8}))_N] = z_2[((n-\frac{7N}{8}))_N] = e^{j\frac{\pi}{4}}z_2[n] = \tilde{z}_2[n] \\ z_3[((n+\frac{N}{8}))_N] = z_3[((n-\frac{7N}{8}))_N] = jz_3[n] \\ z_4[((n+\frac{N}{8}))_N] = z_4[((n-\frac{7N}{8}))_N] = je^{j\frac{\pi}{4}}z_4[n] = j\tilde{z}_4[n] \\ z_5[((n+\frac{N}{8}))_N] = z_5[((n-\frac{7N}{8}))_N] = -z_5[n] \\ z_6[((n+\frac{N}{8}))_N] = z_6[((n-\frac{7N}{8}))_N] = -e^{j\frac{\pi}{4}}z_6[n] = -\tilde{z}_6[n] \\ z_7[((n+\frac{N}{8}))_N] = z_7[((n-\frac{7N}{8}))_N] = -jz_7[n] \\ z_8[((n+\frac{N}{8}))_N] = z_8[((n-\frac{7N}{8}))_N] = -je^{j\frac{\pi}{4}}z_8[n] = -j\tilde{z}_8[n] \end{cases}$$

$$p = 2, n = pN/8 \sim [(p+1)N/8] - 1: \qquad (13)$$

$$\begin{cases} z_1[((n+\frac{2N}{8}))_N] = z_1[((n-\frac{6N}{8}))_N] = z_1[n] \\ z_2[((n+\frac{2N}{8}))_N] = z_2[((n-\frac{6N}{8}))_N] = jz_2[n] \\ z_3[((n+\frac{2N}{8}))_N] = z_3[((n-\frac{6N}{8}))_N] = -z_3[n] \\ z_4[((n+\frac{2N}{8}))_N] = z_4[((n-\frac{6N}{8}))_N] = -jz_4[n] \\ z_5[((n+\frac{2N}{8}))_N] = z_5[((n-\frac{6N}{8}))_N] = z_5[n] \\ z_6[((n+\frac{2N}{8}))_N] = z_6[((n-\frac{6N}{8}))_N] = jz_6[n] \\ z_7[((n+\frac{2N}{8}))_N] = z_7[((n-\frac{6N}{8}))_N] = -z_7[n] \\ z_8[((n+\frac{2N}{8}))_N] = z_8[((n-\frac{6N}{8}))_N] = -jz_8[n] \end{cases}$$

$$p = 3, n = pN/8 \sim [(p+1)N/8] - 1: \qquad (14)$$

$$\begin{cases} z_1[((n+\frac{3N}{8}))_N] = z_1[((n-\frac{5N}{8}))_N] = z_1[n] \\ z_2[((n+\frac{3N}{8}))_N] = z_2[((n-\frac{5N}{8}))_N] = je^{j\frac{\pi}{4}}z_2[n] = j\tilde{z}_2[n] \\ z_3[((n+\frac{3N}{8}))_N] = z_3[((n-\frac{5N}{8}))_N] = -jz_3[n] \\ z_4[((n+\frac{3N}{8}))_N] = z_4[((n-\frac{5N}{8}))_N] = e^{j\frac{\pi}{4}}z_4[n] = \tilde{z}_4[n] \\ z_5[((n+\frac{3N}{8}))_N] = z_5[((n-\frac{5N}{8}))_N] = -z_5[n] \\ z_6[((n+\frac{3N}{8}))_N] = z_6[((n-\frac{5N}{8}))_N] = -je^{j\frac{\pi}{4}}z_6[n] = -j\tilde{z}_6[n] \\ z_7[((n+\frac{3N}{8}))_N] = z_7[((n-\frac{5N}{8}))_N] = jz_7[n] \\ z_8[((n+\frac{3N}{8}))_N] = z_8[((n-\frac{5N}{8}))_N] = -e^{j\frac{\pi}{4}}z_8[n] = -\tilde{z}_8[n] \end{cases}$$

-continued $p = 4, n = pN/8 \sim [(p+1)N/8] - 1:$ (15)

$$\begin{cases} z_1\left[\left(\left(n + \frac{4N}{8}\right)\right)_N\right] = z_1\left[\left(\left(n - \frac{4N}{8}\right)\right)_N\right] = z_1[n] \\ z_2\left[\left(\left(n + \frac{4N}{8}\right)\right)_N\right] = z_2\left[\left(\left(n - \frac{4N}{8}\right)\right)_N\right] = -z_2[n] \\ z_3\left[\left(\left(n + \frac{4N}{8}\right)\right)_N\right] = z_3\left[\left(\left(n - \frac{4N}{8}\right)\right)_N\right] = z_3[n] \\ z_4\left[\left(\left(n + \frac{4N}{8}\right)\right)_N\right] = z_4\left[\left(\left(n - \frac{4N}{8}\right)\right)_N\right] = -z_4[n] \\ z_5\left[\left(\left(n + \frac{4N}{8}\right)\right)_N\right] = z_5\left[\left(\left(n - \frac{4N}{8}\right)\right)_N\right] = z_5[n] \\ z_6\left[\left(\left(n + \frac{4N}{8}\right)\right)_N\right] = z_6\left[\left(\left(n - \frac{4N}{8}\right)\right)_N\right] = -z_6[n] \\ z_7\left[\left(\left(n + \frac{4N}{8}\right)\right)_N\right] = z_7\left[\left(\left(n - \frac{4N}{8}\right)\right)_N\right] = z_7[n] \\ z_8\left[\left(\left(n + \frac{4N}{8}\right)\right)_N\right] = z_8\left[\left(\left(n - \frac{4N}{8}\right)\right)_N\right] = -z_8[n] \end{cases}$$

$p = 5, n = pN/8 \sim [(p+1)N/8] - 1:$ (16)

$$\begin{cases} z_1\left[\left(\left(n + \frac{5N}{8}\right)\right)_N\right] = z_1\left[\left(\left(n - \frac{3N}{8}\right)\right)_N\right] = z_1[n] \\ z_2\left[\left(\left(n + \frac{5N}{8}\right)\right)_N\right] = z_2\left[\left(\left(n - \frac{3N}{8}\right)\right)_N\right] = -e^{j\frac{\pi}{4}}z_2[n] = -\tilde{z}_2[n] \\ z_3\left[\left(\left(n + \frac{5N}{8}\right)\right)_N\right] = z_3\left[\left(\left(n - \frac{3N}{8}\right)\right)_N\right] = jz_3[n] \\ z_4\left[\left(\left(n + \frac{5N}{8}\right)\right)_N\right] = z_4\left[\left(\left(n - \frac{3N}{8}\right)\right)_N\right] = -je^{j\frac{\pi}{4}}z_4[n] = -j\tilde{z}_4[n] \\ z_5\left[\left(\left(n + \frac{5N}{8}\right)\right)_N\right] = z_5\left[\left(\left(n - \frac{3N}{8}\right)\right)_N\right] = -z_5[n] \\ z_6\left[\left(\left(n + \frac{5N}{8}\right)\right)_N\right] = z_6\left[\left(\left(n - \frac{3N}{8}\right)\right)_N\right] = e^{j\frac{\pi}{4}}z_6[n] = \tilde{z}_6[n] \\ z_7\left[\left(\left(n + \frac{5N}{8}\right)\right)_N\right] = z_7\left[\left(\left(n - \frac{3N}{8}\right)\right)_N\right] = -jz_7[n] \\ z_8\left[\left(\left(n + \frac{5N}{8}\right)\right)_N\right] = z_8\left[\left(\left(n - \frac{3N}{8}\right)\right)_N\right] = je^{j\frac{\pi}{4}}z_8[n] = j\tilde{z}_8[n] \end{cases}$$

$p = 6, n = pN/8 \sim [(p+1)N/8] - 1:$ (17)

$$\begin{cases} z_1\left[\left(\left(n + \frac{6N}{8}\right)\right)_N\right] = z_1\left[\left(\left(n - \frac{2N}{8}\right)\right)_N\right] = z_1[n] \\ z_2\left[\left(\left(n + \frac{6N}{8}\right)\right)_N\right] = z_2\left[\left(\left(n - \frac{2N}{8}\right)\right)_N\right] = -jz_2[n] \\ z_3\left[\left(\left(n + \frac{6N}{8}\right)\right)_N\right] = z_3\left[\left(\left(n - \frac{2N}{8}\right)\right)_N\right] = -z_3[n] \\ z_4\left[\left(\left(n + \frac{6N}{8}\right)\right)_N\right] = z_4\left[\left(\left(n - \frac{2N}{8}\right)\right)_N\right] = jz_4[n] \\ z_5\left[\left(\left(n + \frac{6N}{8}\right)\right)_N\right] = z_5\left[\left(\left(n - \frac{2N}{8}\right)\right)_N\right] = z_5[n] \\ z_6\left[\left(\left(n + \frac{6N}{8}\right)\right)_N\right] = z_6\left[\left(\left(n - \frac{2N}{8}\right)\right)_N\right] = -jz_6[n] \\ z_7\left[\left(\left(n + \frac{6N}{8}\right)\right)_N\right] = z_7\left[\left(\left(n - \frac{2N}{8}\right)\right)_N\right] = -z_7[n] \\ z_8\left[\left(\left(n + \frac{6N}{8}\right)\right)_N\right] = z_8\left[\left(\left(n - \frac{2N}{8}\right)\right)_N\right] = jz_8[n] \end{cases}$$

-continued $p = 7, n = pN/8 \sim [(p+1)N/8] - 1:$ (18)

$$\begin{cases} z_1\left[\left(\left(n + \frac{7N}{8}\right)\right)_N\right] = z_1\left[\left(\left(n - \frac{N}{8}\right)\right)_N\right] = z_1[n] \\ z_2\left[\left(\left(n + \frac{7N}{8}\right)\right)_N\right] = z_2\left[\left(\left(n - \frac{N}{8}\right)\right)_N\right] = -je^{j\frac{\pi}{4}}z_2[n] = -j\tilde{z}_2[n] \\ z_3\left[\left(\left(n + \frac{7N}{8}\right)\right)_N\right] = z_3\left[\left(\left(n - \frac{N}{8}\right)\right)_N\right] = -jz_3[n] \\ z_4\left[\left(\left(n + \frac{7N}{8}\right)\right)_N\right] = z_4\left[\left(\left(n - \frac{N}{8}\right)\right)_N\right] = -e^{j\frac{\pi}{4}}z_4[n] = -\tilde{z}_4[n] \\ z_5\left[\left(\left(n + \frac{7N}{8}\right)\right)_N\right] = z_5\left[\left(\left(n - \frac{N}{8}\right)\right)_N\right] = -z_5[n] \\ z_6\left[\left(\left(n + \frac{7N}{8}\right)\right)_N\right] = z_6\left[\left(\left(n - \frac{N}{8}\right)\right)_N\right] = je^{j\frac{\pi}{4}}z_6[n] = j\tilde{z}_6[n] \\ z_7\left[\left(\left(n + \frac{7N}{8}\right)\right)_N\right] = z_7\left[\left(\left(n - \frac{N}{8}\right)\right)_N\right] = jz_7[n] \\ z_8\left[\left(\left(n + \frac{7N}{8}\right)\right)_N\right] = z_8\left[\left(\left(n - \frac{N}{8}\right)\right)_N\right] = e^{j\frac{\pi}{4}}z_8[n] = \tilde{z}_8[n] \end{cases}$$

It can be seen from equations (12)-(18) that transformer 1007 only needs to form N/8-length sub-sequences $z_1[n]$, $z_2[n]$, $z_3[n]$, $z_4[n]$, $z_5[n]$, $z_6[n]$, $z_7[n]$, $z_8[n]$ and obtain $\tilde{z}_2[n]$, $\tilde{z}_4[n]$, $\tilde{z}_6[n]$, $\tilde{z}_8[n]$, n=0, ... (N/8)−1. As the eight subblocks {x[n], n=0, ..., (N/8)−1}, {x[n], n=N/8, ..., 2N/8 −1}, ..., {x[n], n=7N/8, ..., N−1} are no longer needed, the eight memory blocks having N/8 units each in memory 1005 can be released to store $z_1[n]$, $z_2[n]$, ..., $z_8[n]$'n= 0, ..., (N/8)−1. In other words, the required memory is 8×(N/8)+4×(N/8)= 3N/2 units. Finally substituting equations (12)-(18) into equation (10), the following two results can be obtained:

Result 1: p=0, 2, 4, 6, n=0, ..., (N/8)−1

$$\tilde{x}\left[n + \frac{pN}{8}\right] = \sum_{l=1}^{8} \tilde{b}_l \cdot z_l$$ (19a)

where the phase rotation parameter $\tilde{b}_l$ is shown in FIG. 12(*a*).

Result 2: p=1, 3, 5, 7, n=0, ..., (N/8)−1

$$\tilde{x}\left[n + \frac{pN}{8}\right] = \sum_{l=1}^{4} \tilde{b}_{2l-1} \cdot z_{2l-1} + \sum_{l=1}^{4} \tilde{b}_{2l} \cdot \tilde{z}_{2l}$$ (19b)

where the phase rotation parameter $\tilde{b}_l$ is shown in FIG. 12(*b*).

Refer to FIG. 10, after the phase rotation of the eight sub-sequences {$z_1[n]$, $z_2[n]$, ..., $z_8[n]$}, n=0, ..., (N/8)−1, adder 1011 adds them to form the N/8-length transmitted signal {$\tilde{x}[0]$, $\tilde{x}[1]$, ..., [(N/8)−1]}. By using different phase rotation parameter $\tilde{b}_l$, the eight sub-sequences {$z_1[n]$, $z_3[n]$, $z_5[n]$, $z_7[n]$} and {$\tilde{z}_2[n]$, $\tilde{z}_4[n]$, $\tilde{z}_6[n]$, $\tilde{z}_8[n]$} can be used to obtain the next transmitted signal {$\tilde{x}[N/8]$, $\tilde{x}[(N/8) +1]$, ..., x[(2N/8)−1]}. By the same way, the entire N-point transmitted signal $\tilde{x}[n]$ can be obtained.

As shown in FIG. 10 and FIG. 11, when $\tilde{b}_l$ is +1, −1, +j, or −j, the multiplications that present invention requires come from N-IFFT 801, transformer 1007 (including two complex multipliers), and four complex multipliers (for fixed-phase rotations). Therefore, the total amount of complex multiplications is $(N/2)\log_2 N+2\times(N/8)+4\times(N/8)=(N/2)\log_2 N+(3N/4)$, and the memory requirement is $3N/2$ units.

Figure 13:
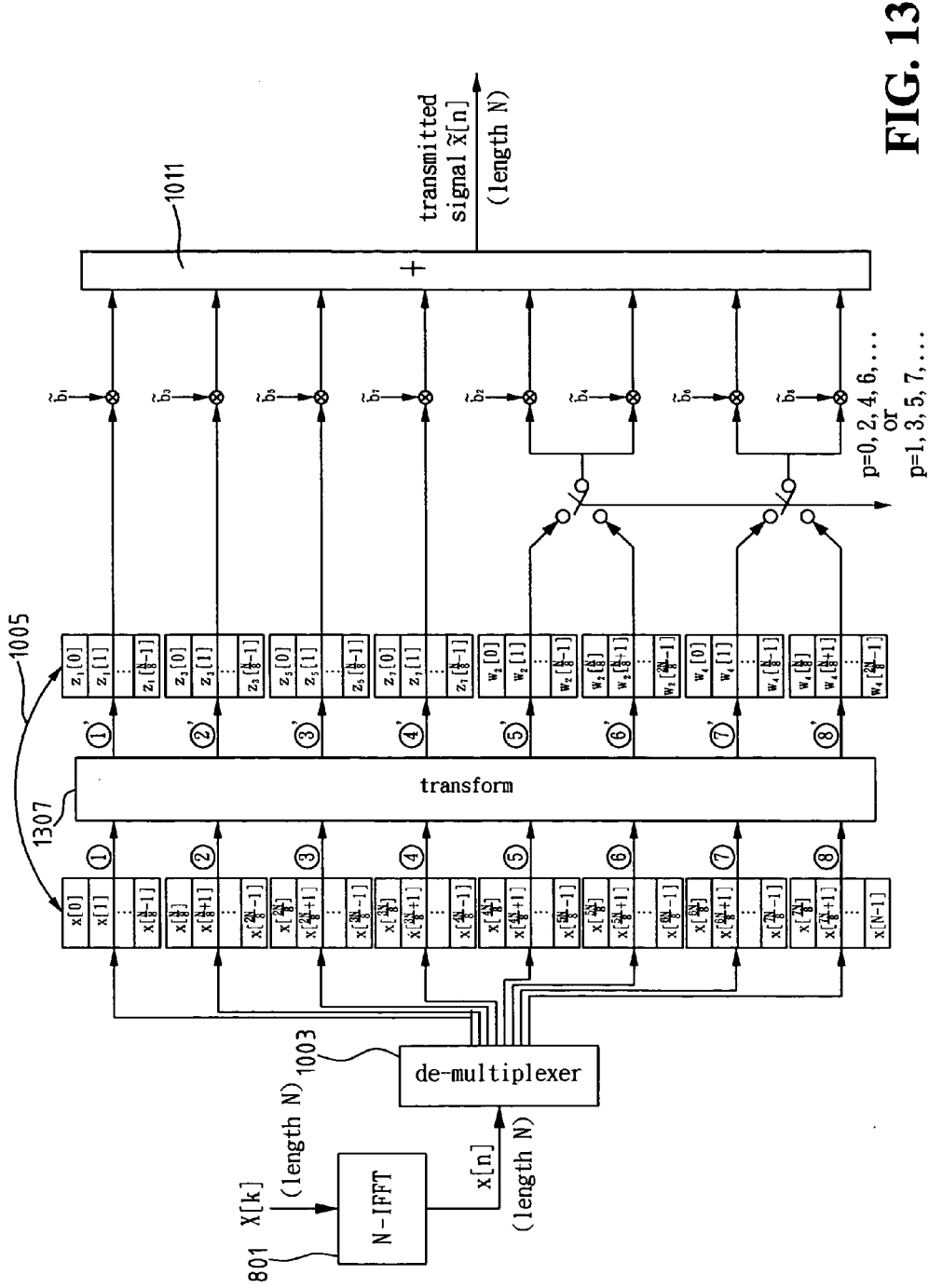
FIG. 13 shows a simplified embodiment of the present invention when M=8.

The following description uses M=8 as an example to explain the simplified embodiment of the high-order PAPR reduction apparatus of the present invention. By losing a slight capability for PAPR reduction, a smaller amount of multiplications and memory requirement can be achieved. FIG. 13 shows a schematic view of the simplified embodiment. The frequency domain sequence X[k] is transformed by N-IFFT 801 into time domain signal sequence x[n]. De-multiplexer 1003 partitions x[n], n=0, 1, . . . , N−1 into 8 subblocks {x[n], n=0, . . . , (N/8)−1}, {x[n], n=N/8, . . . , (2N/8)−1}, . . . , {x[n], n=7N/8, . . . , N−1}, each having the length N/8, and stores them into 8 N/8-length blocks in memory 1005. Substituting equations (9a)-(9h) into equation (10), the following equation can be obtained:

$$\tilde{x}[n] = x[n] \cdot (b_1 + b_5 + b_3 + b_7 + b_2 + b_6 + b_4 + b_8) + \qquad (20)$$

$$x\left[\left(\left(N - \frac{N}{2}\right)\right)_N\right] \cdot (b_1 + b_5 + b_3 + b_7 - b_2 - b_6 - b_4 - b_8) +$$

$$x\left[\left(\left(N - \frac{N}{4}\right)\right)_N\right] \cdot (b_1 + b_5 - b_3 - b_7 + jb_2 + jb_6 - jb_4 - jb_8) +$$

$$x\left[\left(\left(N - \frac{3N}{4}\right)\right)_N\right] \cdot (b_1 + b_5 - b_3 - b_7 - jb_2 - jb_6 + jb_4 + jb_8) +$$

$$x\left[\left(\left(N - \frac{N}{8}\right)\right)_N\right] \cdot$$

$$\{b_1 - b_5 + jb_3 - jb_7 + e^{j\frac{\pi}{4}}(b_2 - b_6) + je^{j\frac{\pi}{4}}(b_4 - b_8)\} +$$

$$x\left[\left(\left(N - \frac{N}{8}\right)\right)_N\right] \cdot \{b_1 - b_5 + jb_3 - jb_7 - e^{j\frac{\pi}{4}}(b_2 - b_6) -$$

$$je^{j\frac{\pi}{4}}(b_4 - b_8)\} + x\left[\left(\left(N - \frac{3N}{8}\right)\right)_N\right] \cdot$$

$$\{b_1 - b_5 - jb_3 + jb_7 + e^{j\frac{\pi}{4}}(b_2 - b_6) + e^{j\frac{\pi}{4}}(b_4 - 8)\} +$$

$$x\left[\left(\left(N - \frac{7N}{8}\right)\right)_N\right] \cdot$$

$$\{b_1 - b_5 + jb_3 + jb_7 - je^{j\frac{\pi}{4}}(b_2 - b_6) - e^{j\frac{\pi}{4}}(b_4 - b_8)\}$$

Equation (20) shows that when $b_2=b_6$ and $b_4=b_8$, it does not require complex multiplication to compute equation (20). Under such circumstances, using equations (9a)-(9h) to express equation (20) as following:

$$\tilde{x}[n] = b_1 z_1[n] + b_5 z_5[n] + b_3 z_3[n] + \qquad (21)$$
$$b_7 z_7[n] + b_2 \cdot \{w_2[n] + jw_4[n]\} + b_4 \cdot \{w_2[n] - jw_4[n]\}$$

where $$w_2[n] = 2 \cdot \left\{ x[n] - x\left[\left(\left(n - \frac{N}{2}\right)\right)_N\right] \right\} \qquad (22a)$$

$$w_4[n] = 2 \cdot \left\{ x\left[\left(\left(n - \frac{N}{4}\right)\right)_N\right] - x\left[\left(\left(n - \frac{3N}{4}\right)\right)_N\right] \right\} \qquad (22b)$$

Based on equations (21) and (12), the following is obtained:

$$\tilde{x}\left[\left(\left(n + \frac{N}{8}\right)\right)_N\right] = b_1 z_1[n] - b_5 z_5[n] + jb_3 z_3[n] - \qquad (23)$$
$$jb_7 z_7[n] + b_2 \cdot \left\{ w_2\left[\left(\left(n + \frac{N}{8}\right)\right)_N\right] + jw_4\left[\left(\left(n + \frac{N}{8}\right)\right)_N\right] \right\} +$$
$$b_4 \cdot \left\{ w_2\left[\left(\left(n + \frac{N}{8}\right)\right)_N\right] - jw_4\left[\left(\left(n + \frac{n}{8}\right)\right)_N\right] \right\}$$

Furthermore, the symmetric relationship can be obtained from equations (22a) and (22b):

$$\begin{cases} w_2\left[\left(\left(n + \frac{2N}{8}\right)\right)_N\right] = w_2\left[\left(\left(n - \frac{6N}{8}\right)\right)_N\right] = -w_4[n] \\ w_4\left[\left(\left(n + \frac{2N}{8}\right)\right)_N\right] = w_4\left[\left(\left(n - \frac{6N}{8}\right)\right)_N\right] = w_2[n] \end{cases} \qquad (24a)$$

$$\begin{cases} w_2\left[\left(\left(n + \frac{3N}{8}\right)\right)_N\right] = w_2\left[\left(\left(n - \frac{5N}{8}\right)\right)_N\right] = -w_4\left[\left(\left(n + \frac{N}{8}\right)\right)_N\right] \\ w_4\left[\left(\left(n + \frac{3N}{8}\right)\right)_N\right] = w_4\left[\left(\left(n - \frac{5N}{8}\right)\right)_N\right] = w_2\left[\left(\left(n + \frac{N}{8}\right)\right)_N\right] \end{cases} \qquad (24b)$$

$$\begin{cases} w_2\left[\left(\left(n + \frac{4N}{8}\right)\right)_N\right] = w_2\left[\left(\left(n - \frac{4N}{8}\right)\right)_N\right] = -w_2[n] \\ w_4\left[\left(\left(n + \frac{4N}{8}\right)\right)_N\right] = w_4\left[\left(\left(n - \frac{4N}{8}\right)\right)_N\right] = -w_4[n] \end{cases} \qquad (24c)$$

$$\begin{cases} w_2\left[\left(\left(n + \frac{5N}{8}\right)\right)_N\right] = w_2\left[\left(\left(n - \frac{3N}{8}\right)\right)_N\right] = -w_2\left[\left(\left(n + \frac{N}{8}\right)\right)_N\right] \\ w_4\left[\left(\left(n + \frac{5N}{8}\right)\right)_N\right] = w_4\left[\left(\left(n - \frac{3N}{8}\right)\right)_N\right] = -w_4\left[\left(\left(n + \frac{N}{8}\right)\right)_N\right] \end{cases} \qquad (24d)$$

$$\begin{cases} w_2\left[\left(\left(n + \frac{6N}{8}\right)\right)_N\right] = w_2\left[\left(\left(n - \frac{2N}{8}\right)\right)_N\right] = w_4[n] \\ w_4\left[\left(\left(n + \frac{6N}{8}\right)\right)_N\right] = w_4\left[\left(\left(n - \frac{2N}{8}\right)\right)_N\right] = -w_2[n] \end{cases} \qquad (24e)$$

$$\begin{cases} w_2\left[\left(\left(n + \frac{7N}{8}\right)\right)_N\right] = w_2\left[\left(\left(n - \frac{N}{8}\right)\right)_N\right] = w_4\left[\left(\left(n + \frac{N}{8}\right)\right)_N\right] \\ w_4\left[\left(\left(n + \frac{7N}{8}\right)\right)_N\right] = w_4\left[\left(\left(n - \frac{N}{8}\right)\right)_N\right] = -w_2\left[\left(\left(n + \frac{N}{8}\right)\right)_N\right] \end{cases} \qquad (24f)$$

Figure 14:
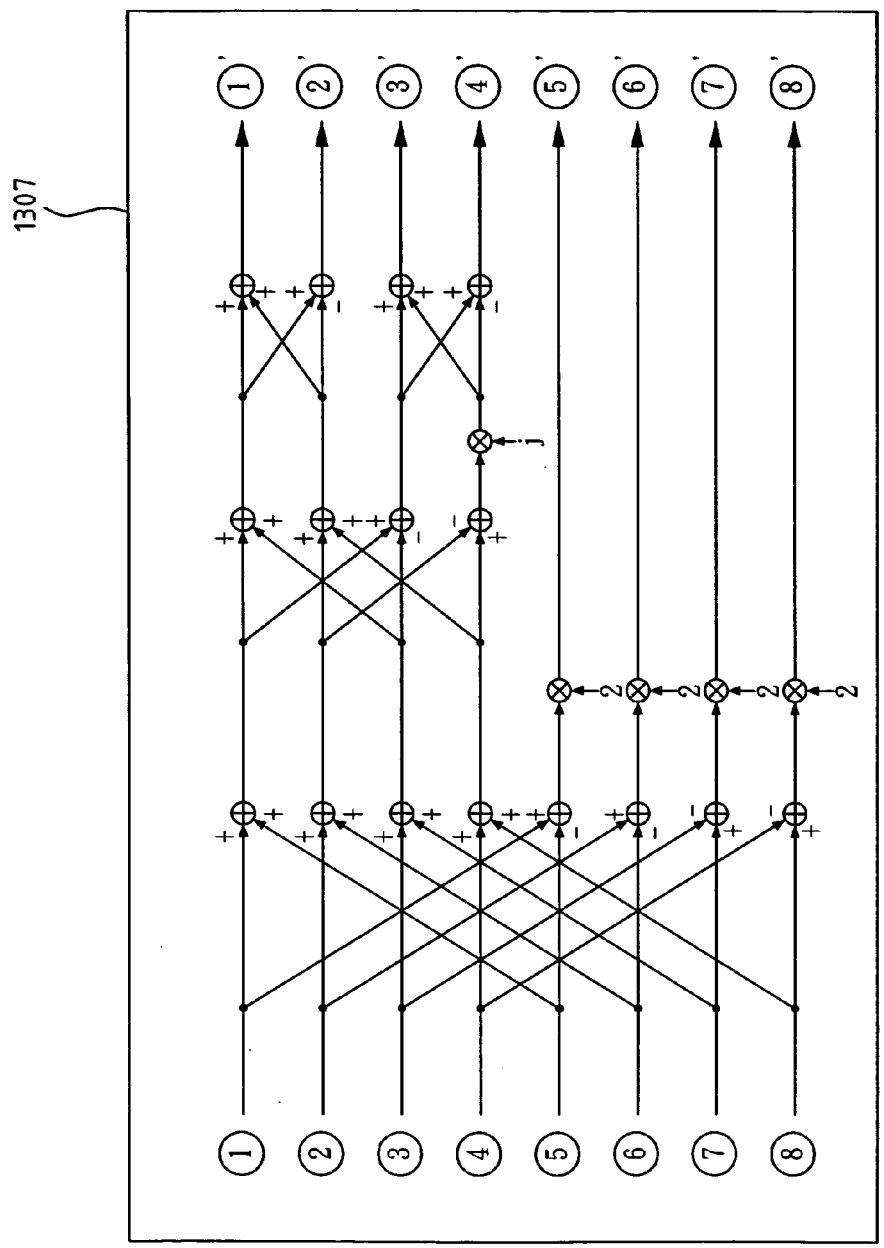
FIG. 14 shows the transformer of FIG. 13.

Based on equations (21), (23), and (24a)-(24f), the transmitted signal $\tilde{x}[n]$ is composed of sub-sequences {$z_1[n]$, $z_3[n]$, $z_5[n]$, $z_7[n]$} and {$w_2[n]$, $w_4[n]$, $w_2[((n+N/8))_N]$, $w_4[((n+N/8))_N]$}. Therefore, transformer 1307 is to transform the eight N/8-length subblocks {x[n], n=0, . . . , (N/8)−1}, {x[n], n=N/8, . . . , (2N/8)−1}, . . . , {x[n], n=7N/8, . . . , N−1} into eight sub-sequences {$z_1[n]$, $z_3[n]$, $z_5[n]$, $z_7[n]$} and {$w_2[n]$, $w_4[n]$, $w_2[((n+N/8))_N]$, $w_4[((n+N/8))_N]$}. According to equations (9a)-(9d), (22a) and (22b), a schematic view of transformer 1307 of FIG. 13 can be shown in FIG. 14. As shown in FIG. 14, transformer 1307 uses 16 adders, a imagery j multiplier and four real multipliers to implement equations (9a)-(9d), (22a) and (22d). The structure is different from an 8-IFFT. The four real multipliers are for the multiplication of real number 2, which can be simply implemented as a shift operation. As a result, transformer 1307 does not require any multipliers.

It can be seen from equations (12)-(18) and (24a)-(24f) that transformer 1307 only needs to form N/8-length sub-sequences {$z_1[n]$, $z_3[n]$, $z_5[n]$, $z_7[n]$} and {$w_2[n]$, $w_4[n]$, $w_2[((n+N/8))N]$, $w_4[((n+N/8))_N]$}, n=0, . . . , (N/8)−1. As the eight subblocks {x[n], n=0, . . . , (N/8)−1}, {x[n], n=N/8, . . . , (2N/8)−1}, . . . , {x[n], n=7N/8, . . . , N−1} are no longer needed, the eight memory blocks having N/8 units each in memory 1005 can be released to store $\{z_1[n], z_3[n], z_5[n], z_7[n]\}$ and $\{w_2[n], w_4[n], w_2[((n+N/8))_N], w_4[((n+N/8))N]\}$, $n=0, \ldots, (N/8)-1$. In other words, the required memory is $8 \times (N/8) = N$ units. Finally substituting equations (12)-(18) and (24a)-(24f) into equations (21) and (23), the following two results can be obtained:

Result 1: $p=0, 2, 4, 6, n=0, \ldots, (N/8)-1$ $$\tilde{x}\left[\left(\left(n + \frac{pN}{8}\right)\right)_N\right] = \tilde{b}_1 z_1[n] + \tilde{b}_5 z_5[n] + \tilde{b}_3 z_3[n] + \tilde{b}_7 z_7[n] + \tilde{b}_2 w_2[n] + \tilde{b}_4 w_2[n] + \tilde{b}_6 w_4[n] + \tilde{b}_8 w_4[n] \quad (25a)$$

where the phase rotation parameter $\tilde{b}_l$ is shown in FIG. 15(*a*).

Result 2: $p=1, 3, 5, 7, n=0, \ldots, (N/8)-1$ $$\tilde{x}\left[\left(\left(n + \frac{pN}{8}\right)\right)_N\right] = \tilde{b}_1 z_1[n] + \tilde{b}_5 z_5[n] + \tilde{b}_3 z_3[n] + \tilde{b}_7 z_7[n] + \tilde{b}_2 w_2\left[\left(\left(n + \frac{N}{8}\right)\right)_N\right] + \tilde{b}_4 w_2\left[\left(\left(n + \frac{N}{8}\right)\right)_N\right] + \tilde{b}_6 w_4\left[\left(\left(n + \frac{N}{8}\right)\right)_N\right] + \tilde{b}_8 w_4\left[\left(\left(n + \frac{N}{8}\right)\right)_N\right] \quad (25b)$$

where the phase rotation parameter $\tilde{b}_l$ is shown in FIG. 15(*b*).

Refer to FIG. 13, after the phase rotation of the six sub-sequences $\{z_1[n], z_3[n], z_5[n], z_7[n]\}$ and $\{w_2[n], w_4[n]\}$, $n=0, \ldots, (N/8)-1$, adder 1011 adds to form an N/8-length transmitted signal $\{\tilde{x}[0], \tilde{x}[1], \ldots, x[(N/8)-1]\}$. By using different phase rotation parameter $\tilde{b}_l$, the six sub-sequences $\{z_1[n], z_3[n], z_5[n], z_7[n]\}$ and $\{w_2[((n+N/8))_N], w_4[((n+N/8))_N]\}$, $n=0, \ldots, (N/8)-1$, can be used to obtain the next transmitted signal $\{\tilde{x}[N/8], \tilde{x}[(N/8)+1], \ldots, \tilde{x}[(2N/8)-1]\}$. By the same way, the entire N-point transmitted signal $\tilde{x}[n]$ can be obtained.

As shown in FIG. 13 and FIG. 14, when $\tilde{b}_l$ is $+1, -1, +j,$ or $-j$, the multiplications that the simplified embodiment of the present invention requires only come from N-IFFT 801. Therefore, the total amount of complex multiplications is $(N/2)\log_2 N$, and the memory requirement is N units.

FIG. 16 shows the comparison of the amount of computation and the memory requirement of the preferred (FIG. 10) and simplified (FIG. 13) embodiments of the present invention and the other three PTS methods, for M=8 and N=64, 256, 1024, and 2048. As can be seen in FIG. 16, the amount of computation and the memory requirement increases rapidly as N increases for the original PTS method and the method disclosed by Kang, Kim and Joo. In comparison, the simplified embodiment of the present invention and the Samsung's method take the minimum number of multiplications (160, 896, 4608, 10240 multiplications, respectively) and require the minimum memory space (64, 256, 1024, 2048 units of memory, respectively). However, the PTS method of the present invention does not shorten the length of the OFDM signal, and therefore still keeps the features and the advantages of the original OFDM system.

In summary, the present invention uses the interleaved partitioning of the subblocks of the PTS method, and uses only an N-IFFT to provide a method and an apparatus for high-order PAPR reduction for OFDM signal. The simplified embodiment of the present invention only takes $(N/2)\log_2 N$ multiplications and requires only N units of memory space. Furthermore, the present invention keeps the features and the advantages of the original OFDM system.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for high-order peak-to-average power ration (PAPR) reduction for an OFDM signal, comprising:
    (a) transforming a frequency domain signal X[k] of length N by an N-IFFT into a time domain signal x[n] of length N, where N is the number of useful data in an OFDM symbol, $n=0, 1, \ldots, N-1$;
    (b) partitioning said sequence x[n] of length N into M disjoint subblocks, M being a power of 2 and greater or equal to 8, and N/M being an integer greater than 1;
    (c) transforming said subblocks into sub-sequences $z_l[n]$, each having the length N/M, $l=1, 2, \ldots, M$ and $n=0, 1, \ldots, (N/M)-1$; and
    (d) each said sub-sequence $z_l[n]$ being processed using complex multiplication followed by phase rotation or directly using phase rotation, then addition to form a complete N-point transmitted signal $\tilde{x}[n]$.

2. The method as claimed in claim 1, wherein said transformation in said step (c) is equivalent to an M-point inverse fast Fourier transform (IFFT).

3. The method as claimed in claim 1, wherein said M is equal to 8.

4. The method as claimed in claim 1, wherein said transformation in said step (c) further comprises addition, imagery multiplication or complex multiplication.

5. The method as claimed in claim 1, wherein said complex multiplication in said step (d) is $e^{j(2\pi/M)}$.

6. The method as claimed in claim 1, wherein said method requires less than or equal to $(N/2)\log_2 N+(3N/4)$ complex multiplications.

7. The method as claimed in claim 1, wherein said step (d) further comprises the steps of:
    (d1) a part of said M sub-sequences $z_l[n]$ being processed using complex multiplication $e^{j(2\pi/M)}$ to form another sub-sequence $\tilde{z}_l[n]$, l being between 1 and M, and $n=0, 1, \ldots, (N/M)-1$; and
    (d2) using different time period to select sub-sequence $z_l[n]$ or $\tilde{z}_l[n]$ for phase rotation, and adding to form a complete N-point transmitted signal $\tilde{x}[n]$.

8. The method as claimed in claim 1, wherein in said step (d), said phase rotation parameter is of the four possibilities $\{+1, -1, +j, -j\}$.

9. An apparatus for PAPR reduction of an OFDM signal, comprising:
    an N-point inverse fast Fourier transform (N-IFFT) for transforming N-length frequency domain signal X[k] into N-length time domain signal x[n], where N is the number of useful data in an OFDM symbol, $n=0, 1, \ldots, N-1$;
    a de-multiplexer for partitioning said time domain signal x[n] of length N into M disjoint subblocks of identical length N/M, where $n=0, 1, \ldots, N-1$, N is an integer greater than 1, M is a power of 2 and greater than or equal to 8, and N/M is an integer greater than 1;
    a transformer transforming said M disjoint subblocks into M N/M-length sub-sequences z[n], where $l=1, 2, \ldots,$ M and n=0, 1, . . . , (N/M)−1, for further complex multiplication or phase rotation;

at most M complex multipliers executing said complex multiplication on a part of said sub-sequences $z_1[n]$ to form another sub-sequence $\tilde{z}_l[n]$, where l is between 1 and M, and n=0, 1, . . . , (N/M)−1;

two sets of memories, one said memory storing said M disjoint subblocks and said M sub-sequences $z_1[n]$, and the other said memory storing said sub-sequences $z_1[n]$; and an adder for adding said sub-sequences $z_1[n]$ and $\tilde{z}_l[n]$, after phase rotation, to obtain a complete N-point transmitted signal $\tilde{x}[n]$.

10. The apparatus as claimed in claim 9, wherein said M is 8, and said transformer is implemented with 24 adders, 3 imagery j multipliers and 2 complex multipliers.

11. The apparatus as claimed in claim 9, wherein said M is 8, and said transformer is implemented with 16 adders, 1 imagery j multipliers and 4 real multipliers.

12. The apparatus as claimed in claim 9, wherein said apparatus only uses an N-point inverse fast Fourier transform (N-IFFT).

13. The apparatus as claimed in claim 9, wherein said two sets of memories require less than or equal to 3N/2 units of memory.

* * * * *